(12) United States Patent
Van Megchelen

(10) Patent No.: US 8,590,776 B2
(45) Date of Patent: Nov. 26, 2013

(54) PHYSICAL PRODUCT SAMPLE PROVIDED WITH AT LEAST ONE PRODUCT SAMPLE CODE

(75) Inventor: Oedses Klaas Van Megchelen, Ede (NL)

(73) Assignee: Van Megchelen & Tilanus B.V., Ede (NL)

( * ) Notice: Subject to any disclaimer, the term of this patent is extended or adjusted under 35 U.S.C. 154(b) by 81 days.

(21) Appl. No.: 12/989,642

(22) PCT Filed: May 20, 2010

(86) PCT No.: PCT/NL2010/050302
§ 371 (c)(1),
(2), (4) Date: May 11, 2011

(87) PCT Pub. No.: WO2010/134812
PCT Pub. Date: Nov. 25, 2010

(65) Prior Publication Data
US 2012/0055984 A1    Mar. 8, 2012

(30) Foreign Application Priority Data

May 20, 2009  (NL) ........................... 2002909
Sep. 7, 2009  (NL) ........................... 2003447
Oct. 6, 2009  (WO) ............... PCT/NL2009/050598

(51) Int. Cl.
*G06F 17/00*  (2006.01)
*G06Q 30/02*  (2012.01)

(52) U.S. Cl.
CPC ...................................... *G06Q 30/02* (2013.01)
USPC ............ 235/375; 235/383; 235/385; 235/487

(58) Field of Classification Search
CPC ....................................................... G06Q 30/02
USPC .................................. 235/375, 383, 385, 487
See application file for complete search history.

(56) References Cited

U.S. PATENT DOCUMENTS 6,701,369 B1   3/2004  Philyaw
7,341,191 B2   3/2008  Russell et al.
7,578,432 B2   8/2009  Libin et al.
(Continued)

FOREIGN PATENT DOCUMENTS

EP   1043670 A2   10/2000
EP   1043670 A3   4/2002
(Continued)

OTHER PUBLICATIONS

Berners-Lee, et al. Uniform resource identifier (URI): generic syntax. Internet engineering task force. 2005.
(Continued)

*Primary Examiner* — Ahshik Kim
(74) *Attorney, Agent, or Firm* — The Webb Law Firm, PC

(57) ABSTRACT

Physical product samples provided with at least one physical product sample code. Physical product sample codes for the purpose of providing a physical product related information. Methods for compiling such a physical product sample code. Methods for providing a physical product sample with such a physical product sample code. Methods for acquiring physical product sample related information, wherein said physical product sample is provided with such a physical product sample code. Systems for compiling a physical product sample code using the method for compiling said sample code.

20 Claims, 13 Drawing Sheets

(56) References Cited

U.S. PATENT DOCUMENTS

| | | |
|---|---|---|
| 2001/0030234 A1 | 10/2001 | Wiklof |
| 2006/0011720 A1* | 1/2006 | Call ............................ 235/383 |
| 2008/0245870 A1* | 10/2008 | Lee et al. ................. 235/462.01 |
| 2009/0028417 A1* | 1/2009 | Floeder et al. ................ 382/141 |

FOREIGN PATENT DOCUMENTS

| | | |
|---|---|---|
| EP | 1047004 A2 | 10/2010 |
| WO | WO 98/24036 A1 | 6/1998 |
| WO | WO 00/16211 A1 | 3/2000 |
| WO | PCT-NL-2010-050304 | 5/2010 |
| WO | WO 2010/134802 A1 | 11/2010 |
| WO | WO 2010/134812 A1 | 11/2010 |
| WO | WO 2010/134813 A1 | 11/2010 |

OTHER PUBLICATIONS

Bide. In search of the unicorn: the digital object identifier from a user perspective. BNBRF report 89. 1998; 1-36.

Kindberg, et al. The tag URI scheme and URI namespace. World wide web consortium. 2002.

Kindberg, et al. Towards a real-world wide web. Internet and mobile systems laboratory. 2000.

Paskin, et al. The doi URI scheme for the digital object identifier. Internet engineering task force. 2003.

Rekimoto, et al. Cybercode: designing augmented reality environments with visual tags. Proceedings of DARE. 2000.

* cited by examiner

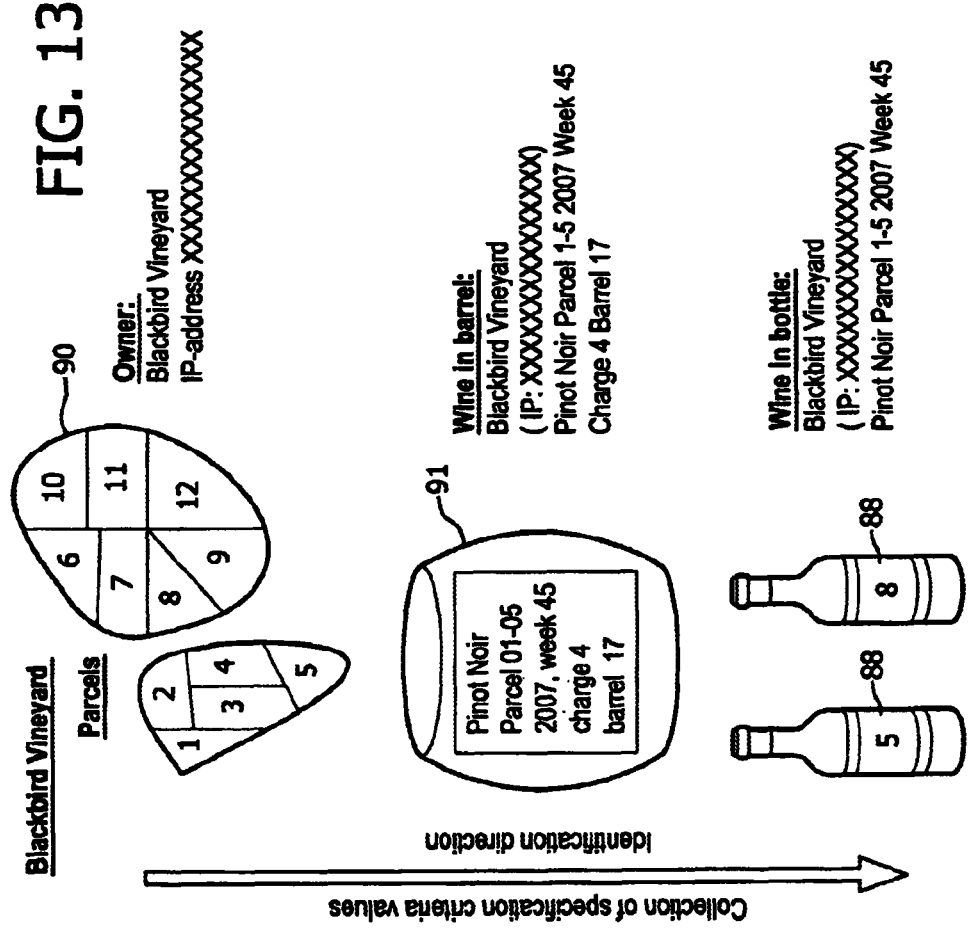
FIG. 13
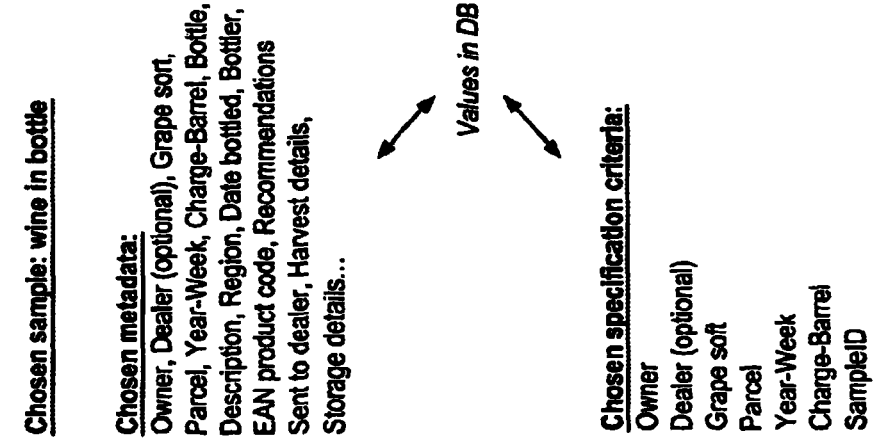

PHYSICAL PRODUCT SAMPLE PROVIDED WITH AT LEAST ONE PRODUCT SAMPLE CODE

This application claims priority to PCT/NL2010/050302 filed May 20, 2010 which published as WO 2010/134812 A1 on Nov. 25, 2010, which claims priority to NL Patent Application No. 2002909 filed May 20, 2009; NL Patent Application No. 2003447 filed Sep. 7, 2009; and PCT/NL2009/050598 filed Oct. 6, 2009, each of which is hereby incorporated herein by reference.

BACKGROUND

Some embodiments described herein relate to a physical product sample provided with at least one physical product sample code. Some embodiments described herein relate to a physical product sample code that may be used to locate or provide a physical product sample. Some embodiments described herein further relate to a method for compiling such a physical product sample code. Some embodiments described herein additionally relate to a method for providing a physical product sample with such a physical product sample code. Some embodiments described herein moreover relate to a method for acquiring physical product sample related information, wherein said physical product sample is provided with such a physical product sample code. Some embodiments described herein further relate to a computer-readable medium with computer-executable instructions which, when loaded onto a computer system, provide the computer system with the functionality of any of the aforementioned methods. Some embodiments described herein also relate to a system for compiling a physical product sample code using the method for compiling said sample code.

'Globalization' is commonly used as a shorthand way of describing the spread and connectedness of production, communication and technologies across the world. That spread has involved the interlacing of economic and cultural activity. This globalization in the sense of connectivity in economic and cultural life across the world, has been growing for centuries. However, many believe the current situation is of a fundamentally different order to what has gone before. The speed of communication and exchange, the complexity and size of the networks involved, and the sheer volume of trade, interaction and risk give what we now label as 'globalization' a peculiar force. One has described globalization as the intensification of worldwide social relations which link distant localities in such a way that local happenings are shaped by events occurring many miles away and vice versa. This involves a change in the way we understand geography and experience localness. As well as offering opportunity it brings with considerable risks linked, for example, to marketing, technological change, and business control.

Globalization, thus, has powerful economic, political, cultural and social dimensions. Developments in the life sciences, and in digital technology and the like, have opened up vast, new possibilities for production and exchange. Innovations like the Internet have made it possible to access information and resources across the world and to coordinate activities in real time. An important downside of the globalization is the creation of a diffuse market in which it is getting harder and harder to control product marketing and supply chain processes leading to an explosion in the international trade in counterfeit products which lead to both infringement of the owner's intellectual property rights and to misleading of unaware customers. Product counterfeiting is a big business—estimated to cost hundreds of billions of euros each year. It impacts the global economy in a variety of ways including consumers that believe they are buying authentic products, legitimate manufacturers that invest in safety and quality manufacturing processes, and retailers that want to provide safe, reliable products to their customers. Since the products are commonly labelled with a conventional code, such as a conventional barcode, it is commonly very troublesome to track and trace legitimate products and to distinguish counterfeited products from legitimate products.

There is a first need to improve the ability to track and trace legitimate products to protect owners and other parties involved in the product supply chain against infringement of intellectual property rights and to protect the customer against fraudulent manipulation of products.

There is a second related need to improve distribution of and access to product-related information to consumers and/or to other parties involved in the product supply chain, which is an important tool for verifying the authenticity of the product, and moreover for minimizing sales cycle times, improving user satisfaction, reducing warranty costs, and minimizing manufacturer liability. The presentation of desired and regulated information often occupies a great deal of physical product label space and is often limited to the industrial and aesthetic design of the physical product packaging.

A physical product sample may be provided with at least one unique sample code, said physical product sample code comprising at least a sample owner identifying code segment, and a sample identifying code segment, wherein the sample owner identifying code segment is specified by an Internet address, in particular an IP address and/or a domain name, of an owner of the physical sample, said sample code string as such both identifies the physical product sample and represents a reference to a unique digital location via which digital location access can be gained to information related to the physical product sample. By labelling each physical product sample with a world-wide unique physical product sample code acting as worldwide unique identifier, comparable with a DNA profile or fingerprint, one specific physical product sample can be distinguished easily and unambiguously from another physical product sample throughout the world regardless of its context. This world-wide unique identification is facilitated by the recognizable (identifiable) incorporation of the IP address and/or the domain name of a (present or prior) owner of the physical product sample. Moreover, since the sample code is associated with a digital path to a digital location where or via which information (metadata), such as specific physical product sample details about the product, production process, data of origin, personal user related information, et cetera, relating to said physical product sample is stored and can be traced/found, it can be verified relatively easily whether the physical sample has been manipulated or is authentic. Since the information stored at the digital location is sample specific rather than kind specific (variety specific), this can not only result in the ability to provide detailed and tailored information to customers for improving e.g. customer satisfaction in a relatively easy and user-friendly manner, but can also improve the ability to verify the authenticity of the physical product sample as such.

A physical product sample, also considered as a single individual product entity, is thus defined to have a unique identity and to be distinguishable (individualizable) from all other physical product samples in the scope of its specification criteria, with certainty. A physical product sample as individual entity therefore clearly differs from a product series, a product category, or a product variety. In the context of the patent application the nature and representation of the term "physical product sample" is a physical item or being including, for example a good, a packaging of goods, such as a blister pack or a pellet with goods; a person, or an animal. The term "owner" incorporates (among others) the originator, publisher, distributor, author, and/or creator, wherein it may be advantageous in case an actual or previous ownership of the physical product sample can be deduced from the IP address and/or the domain name of the owner as used and visualized in the sample code itself The term "digital location" can be a location at a computer of the owner as code issuing party, though it can also be a remote location in a private or public cloud computing infrastructure employing Internet-based computing, whereby shared resources, software and information are provided to computers and other devices on-demand, like a public utility.

The physical product sample code is commonly attached to the physical product sample, and may in particular be printed on (a label of) the physical product sample. In case the physical product sample code is printed on a label of the physical product sample, a user can easily identify and read the sample code, and may therefore commonly easily recognize the metadata, such as the owner identity, of the code segments used, after which the sample code may directly—thus without any conversion step—be entered as URL into a web browser to retrieve tailored information about the physical product sample.

Commonly, the physical product sample code is provided in an alphanumeric format, wherein separation characters may be applied to separate adjacent sample code segments. The physical product sample code may be represented in a machine-readable format on the physical product sample. In case the sample code is printed on (a label of) the physical product sample, the sample code may be read, for example, by using an optical scanner. By applying optical character recognition, the scanned sample code will be converted into a set of characters identical to the sample string of the sample code, which can subsequently be entered either automatically or manually into a web browser. The machine-readable sample code may also be represented in an encrypted iconographic format, such as a 2D/3D barcode and/or as a RFID tag. It should be noted that these iconographic representations commonly look similar to the known iconographic representations, though the content, meaning, and use of the iconographic representation of the physical product sample code is completely different from the iconographic representation of known product series codes. The sample code may be represented as an alias on the physical product code, although it may be preferable that the Internet address of the originator remains recognizable for a user from the product.

The sample code segments are selectively ordered to build an identifying path referring either directly or indirectly to a digital location, in particular a web location, where information relating to the physical sample can be found. The digital path may commonly represent a Uniform Resource Locator (URL) which may (automatically) be provided with a prefix, such as http, https, ftp, ftps, mailto, file, by a web browser.

In an embodiment, the sample code itself may represent at least a part of a digital path where information relating to the specific sample is stored, meaning that the sample code is incorporated in the digital path. In case the sample code and the digital path are mutually distinctive a cross-reference should be present between the sample code representing a first web address and the digital location representing a second web address. Commonly this cross-reference is stored in a database. Storing the cross-reference as a link between the sample code and the digital path may facilitate translating the sample code into a digital path where the sample related information can be found. Moreover, storage of this data may facilitate updating the cross-references in case of a change of the digital path in order to prevent unlinking (dead linking) of the sample code with respect to the actual location where the sample related information is stored and can be traced and found. Upon entering of the sample code in a web browser by a user, the sample code entered may be compared with a corresponding sample code stored in the database, wherein the user is redirected to a digital path stored in the database as a cross-reference of the stored sample code. Indirect redirection may be implemented by using a programmed script for automatically comparing the entered sample code with the sample codes in the database, and directing the user to the digital location providing additional information about the physical sample.

The sample code segments are selectively ordered to build an identifying path referring directly or indirectly (via a cross-referenced digital path) to a digital location where physical product sample related information can be found. Since the universally unique physical product sample code commonly represents a URL to make this physical product sample code suitable for world-wide use and to obtain simple and easy access to the physical product sample related information, the owner identifying code segment commonly comprises a domain name and/or an IP address associated with a web location where the information related to the physical product sample is stored. The domain name and/or the IP address are commonly related to the manufacturer, creator, and/or (original) owner of the physical product samples. The owner identifying code segment may also be linked to an identity of an owner holder.

Besides the owner identifying code segment and the sample identifying code segment the physical product sample code, the physical product sample code may comprise various other code segments. In an embodiment the sample code string comprises at least one checking code segment representing the result of a predetermined mathematical processing of at least one other sample code segment. The algorithm used to calculate the value of the checking code segment may be defined when defining the sample code structure during compilation of the sample code. This algorithm may for example show similarities with the known ISBN (International Standard Book Number) code check. The algorithm for generating an ISBN check characters works as follows. To generate the ISBN check character, each ISBN digit is multiplied by a predetermined associated weighting factor and the resulting products are added together. The weighting factors for the first nine digits begin with 10 and form the descending series 10, 9, 8 . . . 2. Thus for the nine digits 0 9 4 0 0 1 6 3 3, the products summed are 0+81+32+0+0+5+24+ 9+6=157. This sum is divided by the number 11. (157/11=14 with 3 remainder). The remainder, if any, is subtracted from 11 to get the check digit. (11−3=8). If the check digit is 10, it is represented by the Roman numeral X. The final ISBN in this example is accordingly 0-940016-33-8. By generating the check digit and comparing it with the received check digit, the validity of the ISBN may be verified. As mentioned above, a similar or comparable check may be incorporated in the physical product sample code.

The sample code string may further comprise at least one user related code segment. Although each physical product sample code, irrespective of the presence of a user related code segment, in fact functions as a worldwide unique personal code, the advantage of incorporating a user related code segment is that the content stored at the digital location can be made more personal, wherein personal information of the customer—if agreed upon—can be displayed as content at the digital location. In practice, this would commonly require a last-minute compilation of the physical product sample code after registration of the buyer's data, such as name, address, et cetera. For example, in case a buyer would buy a pair of shoes at a physical store or a digital (web) store, the physical product sample code incorporating a user related code segment may be compiled after registration and—commonly—after approval of the order. The buyer will receive his pair of shoes, wherein the pair of shoes and/or the shoe box as packaging is provided with the physical product sample code. By using this physical product sample code as path reference to the digital location tailored physical product sample specific information can be retrieved, which may be displayed in the form of a personal webpage which may e.g. comprise details relating to the buyer, the pair of shoes, the store, the salesman, warranty information, previous orders, personally recommended products, etcetera. The user related code segment may commonly form metadata, such as a client number or pseudonym, referring to the buyer. It is also conceivable that the user related code segment comprises a user identifying code segment. In this manner the identity, such as the name, of the user/buyer becomes directly clear from metadata represented by the code segments.

It is further imaginable that the sample code string comprises at least one intermediary identifying code segment relating to the identity of an intermediary e.g. used to manufacture, supply, support, distribute, sell, and/or promote the physical product sample.

The sample code string may also comprise at least one production process related code segment relating to at least one parameter of the production process of the physical product sample. This production process related code segment may cover for example the date and/or the location of manufacturing, and/or more specific production process parameters, like the temperature at which the physical product sample is manufactured or the material from which the physical product sample is manufactured.

The sample code string commonly further comprises at least one punctuation mark for separating adjacent sample code segments. This punctuation mark may be of a different nature, though since the sample code commonly also acts as URL often a slash ('/') sign is used to separate adjacent code segments. In a correct URL syntax commonly a slash sign is also positioned behind the last code segment. In addition to these separation characters, also other typographic signs, like a tilde ('~'), a dot ('.'), an underscore ('_'), and a minus sign ('-'), may be used between and/or within the code segments themselves.

Embodiments also may relate to a universally unique physical product sample code for the purpose of providing and identifying a physical product sample with as defined already above in a comprehensive manner.

Embodiments further may relate to a method for compiling such a universally unique physical product sample code, comprising: A) defining at least one sample code template comprising multiple sample code segments to be used for building a sample code for a physical product sample, said sample code segments at least comprising: a sample owner identifying code segment, and a sample identifying code segment, B) specifying the content of the sample code segments to be used for building said sample code, wherein the sample owner identifying code segment is specified by an Internet address, in particular an IP address and/or a domain name, of an owner of the physical sample, C) stringing the specified sample code segments to form the sample code, D) defining a digital path, such as a URL, to a digital location via which access can be to information related to the physical sample, and E) creating a cross-reference between the sample code generated during step C) and the digital path defined during step D) if the sample code and the digital path are mutually distinctive.

In an embodiment, the method includes step F) comprising storing the sample code, the digital path, and the cross-reference between the sample code and the digital path in a database. As already mentioned, storing the cross-reference as a link between the sample code and the digital path may facilitate translating the sample code into a digital path where the physical sample can be found. Additionally, storage of this data may facilitate updating the cross-references in case of a change of the digital path in order to prevent unlinking (dead linking) of the sample code with respect to the actual location where the physical sample related information is stored and can be traced and found.

The sample code segments are selectively ordered to build an identifying path referring either directly or indirectly to a digital location, in particular a web location, where the digital sample can be found. The digital path may commonly represent a Uniform Resource Locator (URL) which may (automatically) be provided with a prefix, such as http, https, ftp, ftps, mailto, file, by a web browser. In an embodiment, at least a part of the digital path is identical to the sample code, meaning that the sample code is incorporated in the digital path. In case the sample code and the digital path are substantially identical, creating a cross-reference in accordance with step E) may be omitted. In this respect, the term "substantially identical" is being used to show that there may be a minor differences between the sample code and the digital path which do not have any effect in practice. For example, although the digital path may commonly have a prefix, such as "http://", such a prefix may not be present in the visualized sample code itself. However, since most web browsers will automatically add a prefix in front of a web address not already having such a prefix, the sample code as such may easily be used as web address (digital path) leading to a web location (digital location) where the requested digital sample is stored.

The method optionally comprises step G) comprising converting the sample code generated during step C) into a machine-readable format. Advantages have been described above. Alternatively, the method comprises step H) comprising translating at least the sample identifying code segment of the sample code into another language and matching characters. Since the sample identifying code segment may comprise metadata relating to the physical sample associated with the sample code and the metadata provides relevant recognizable information about the physical sample, it may be user-friendly to offer and display these metadata in the language of the location/country where the physical sample code is issued. An example of possible metadata incorporated and named in the at least one sample identifying code segment is information relating to the author, title, subject, keywords, size, version, date of creation, remarks, and/or status of the physical sample. The IP address and/or the domain name of an owner as incorporated in the owner identifying code segment is commonly not translated and commonly remains unchanged during step H).

In an embodiment the sample code segments defined during step A) further comprise a user related code segment which may either be static or dynamic (dependent on one or more parameters which change in course of time). Although each sample code, irrespective of the presence of a user related code segment, already functions as a world-wide unique personal code, one advantage provided by incorporating a user related code segment is that the content stored at the digital location can be made more personal to the user. If agreed upon, personal information of the customer such as a client number, pseudonym and/or personal permissions (e.g., read/write permissions), can be displayed as content at the digital location and/or as metadata incorporated in the user related code segment. This user information may be static which therefore results in a static user related code segment. It is also imaginable that the user related segment incorporates user related information (metadata) which varies with the course of time, such as the age of the user or other personal information. Once issued, the sample code will generally not change, but the sample code issued may be dependent on parameters which are applicable at the moment of issuing the sample code. In practice, this would commonly require a last-minute compilation of the product sample code after registration of relevant user data, such as name, address, et cetera. It is conceivable that the user related code segment comprises a user identifying code segment. In this manner, the identity, such as the name of the user, is evident from metadata represented by the code segments.

It is further imaginable that the sample code string comprises at least one intermediary identifying code segment relating to the identity of an intermediary e.g., used to manufacture, supply, support, distribute, sell, and/or promote the product sample. The intermediary identifying code segment, optionally based on the domain name or IP address of the intermediary, may comprise the identity of the intermediary but may also comprise other metadata relating to the intermediary, such as a platform or service offered to the public via which physical samples can be accessed. One example is related to the distribution of a (unique) pair of Nike shoes type Air Max via department store Harrods. A sample code associated with a specific physical sample may be represented as follows: "www.nike.com/harrods.com/airmax-12345", wherein "www.nike.com" represents the owner identifying code segment, "harrods.com" represents the intermediary identifying segment, and "airmax-12345" represents the physical sample identifying segment including metadata relating to the shoe type of the physical sample. This sample code represents a web link which leads—either directly or indirectly—to information related to that specific sample.

It may be beneficial during step A) to define at least one punctuation mark for separating adjacent code segments during step C) and/or a checking code segment as already elucidated above.

In another embodiment the sample code segments defined during step A) further comprises a sample code security identifying code segment. Application of this code segment can counteract abuse of the sample code by parties with malicious intent, since this security identifying code segment can be used as a check to determine the authenticity of the sample code. For example, after entering the sample code into a web browser, a validity check of the sample code security identifying code segment may be performed. This security related code segment may be time-dependent ("dynamic"), meaning that the code segment will only be valid for a limited period of time. In case the security check shows that the sample code is no longer valid or in force, access to the physical sample will not be granted. The security identifying code segment hence acts as an interactive key to gain access to the (web) page where the physical sample related information is stored.

During step A) not only the number and kind of the code segments used to build a code may be defined, but also the order of defined code segments to be stringed may also be defined. This allows for creation of a complete sample code template (code format), wherein code segments are ordered in a predetermined order. Determining the order of code segments during step A) can enhance the handling of sample codes and co-related storage locations of the physical sample related information.

In an embodiment, step A) may be repeatedly performed to generate multiple sample code templates, wherein the method further comprises step I) comprising choosing a code template to be applied prior to executing step B). Generating multiple templates may allow for additional differentiation in sample codes provided to users. For example, a party may offer physical samples directly to customers and indirectly to customers by making use of an intermediary. In doing so, different sample code templates may be used, where the direct customers may receive a code such as "www.owner.com/sample_id__1234" which does not use an intermediary, while indirect customers may receive a code such as "www.owner.com/intermediary.com/sample_id__5678" which utilizes an intermediary.

The aforementioned method may be performed using a software module having a user interface to allow the user to generate a world-wide unique sample code.

An embodiment also relates to a method for providing a physical sample with a unique sample code, comprising: J) creating a physical sample, K) compiling a unique sample code for the physical sample according to the method described above, L) marking the physical sample with at least one compiled sample code, M) storing sample information related to the physical sample at a digital location, N) storing the sample code, and O) creating a cross-reference between a digital path referring to said digital location and the sample code in case the sample code and the digital path are mutually distinctive. Marking the sample with the physical sample code according to step L) may facilitate tracking and tracing of the physical sample. A physical sample may be labelled with multiple unique sample codes. The multiple unique sample codes are commonly printed on the physical sample and/or attached to the physical sample in a manner visible and recognizable for a standard user.

In an embodiment, the method may include step P) comprising providing the sample code to a user, in particular the creator of the physical sample. This may be performed by sending the user an e-mail which includes the sample code. The sample code may be displayed as plain text in the body of the email which contains a hyperlink. Alternatively, the sample code may be attached as a separate attachment to the email. Since the sample code is commonly represented by a string of a limited number of alphanumeric signs and punctuation marks, the sample code is commonly no larger than 1 kilobyte. Since only the sample code and not the physical sample related information as such is distributed, Internet traffic and storage load may be significantly reduced. By storing sample codes instead of the sample files in a computing cloud, users can be offered a secure exchange of information in cloud computing environment.

An embodiment further relates to a method for gaining access to a physical sample provided with a unique sample code according to the method defined above, comprising: Q) providing the sample code to a user, R) allowing to the user to enter the sample code into a web browser, and S) redirecting the user to the digital location where the physical sample related information is stored. When the user is redirected to the digital location, access to the sample information can be gained. Redirecting to may be considered as referring to. For example the redirection may be either direct or indirect. Direct redirection may refer to entering the sample code as a web address into an address bar of a web browser, where the physical sample related information is stored at said web address. In comparison, indirect redirection may refer to entering the sample code into the web browser and translating the sample code into a digital path such as a URL by using a cross-reference database or table, after which the user is led to the digital path where the physical sample related information is stored. During step S) the sample code entered during step R) may be compared with a corresponding sample code stored in the database, wherein the user is redirected to a digital path stored in the database as a cross-reference of the stored sample code. During step Q, the sample code may be provided as a hyperlink to the user, wherein during step R) the user can automatically enter the sample code into the web browser by clicking the hyperlink. Indirect redirection may be implemented by using a programmed script for automatically comparing the entered sample code with the sample codes in the database, and directing the user to the digital location where the physical sample related sample specific information is stored.

An embodiment moreover relates to a computer-readable medium with computer-executable instructions which, when loaded onto a computer system, provide the computer system with the functionality of the method for compiling a sample code, and/or the method of providing a sample code to a physical sample as described above. Examples of computer-readable media are USB-sticks, internal and external hard drives, diskettes, CD-ROM's, DVD-ROM's, and others.

An embodiment also relates to a database comprising at least one cross-reference between a sample code according to an embodiment and a digital path to a digital location where a physical sample associated with said sample code is stored. The use of such a cross-reference table allows the sample code to be converted into a digital path to a digital location where the physical sample can be found.

An embodiment further relates to a system for compiling a world-wide unique sample code using the above method, comprising: at least one sample code template generator for defining at least one sample code template comprising multiple sample code segments to be used for building a sample code for a physical sample, said sample code segments at least comprising a sample owner identifying code segment, and a sample identifying code segment, at least one sample code segment specification module connected to said template generator for specifying the content of the sample code segments defined by means of the code template generator, wherein the sample owner identifying code segment is specified by an address of an owner of the physical sample, at least one code generator connected to said template generator and said specification module for stringing the specified sample code segments to form the world-wide unique sample code, and at least one database for storing at least one cross-reference between a generated sample code and a digital path to a digital location via which access can be gained to physical sample related information in case the sample code and the digital path are mutually distinctive. For example, some embodiments of the sample code have already been described herein.

In some embodiments, the system may be a (cloud) computer-implemented system which may be fully automated after proper setup and initialization. An embodiment of the system may further include at least one service module for administering the system for issuing a sample code. A digital user/administrator interface for controlling and maintaining the template generator, the specification module, and the code generator are included in the system according to an embodiment. The system may additionally include a sample storage device for storage of physical sample related information at a digital location of which the digital path is stored in the database. An example of a suitable sample storage device is a web server, optionally in the cloud. In an embodiment, the system further includes a distribution/communication module for distributing/communicating the generated sample code to one or more users.

An embodiment relates to a system for handling a request for gaining access to a physical sample provided with a sample code according to the method described above, comprising: a web client for allowing a user to enter the sample code, and a handling module connected to said web client for comparing the sample code entered with a corresponding sample code stored in a database as defined in the aforementioned system, wherein the user is redirected to a digital path stored in said database as cross-reference of said stored sample code for gaining access to physical sample related information. The web client is commonly formed by a user's computer and/or a user's mobile device on which an Internet browser has been installed. The web client may thus either be a computer or a mobile device, in particular a smart phone, connected to the Internet.

Embodiments can allow for clear identification of the origin or source of the physical sample as well as of the physical sample itself. The sample code segments may be constructed together to allow for access to the physical sample through a digital path in a manner similar to a URL, while also uniquely identifying the physical sample, its ownership and/or source, and any intermediary or other information identified in the sample code segments. This integration of the code segments may also enable the owner or source or the owner's system or the source's system to track and trace what happens with the physical sample. Tracking and tracing can be facilitated by logging the sample related market activities, such as the date and location at which and from which a sample code is submitted by a user using the Internet in order to request the tailored sample related information.

Embodiments allow for a context-independent, broad or worldwide identification of specific samples based on metadata particular to each individual sample. If desired, the code system described in embodiments could be used in a specific internal scope by including an internal reference to the origin or scope of the sample inaccessible to outside users. In addition, a purely internal specification scope of the code system used by a specific company could be transformed into an external scope accessible to other organizations or individuals by integrating the origin or source of the sample into the specification scope. A scope change to transforming an external specification scope of the code system to an internal scope could also be similarly performed by removing a reference to the origin or scope of the sample. Furthermore, a code system according to an embodiment could be configured to allow for access to a variety of samples of different types. The other organizations or individuals may be provided access on a selected basis according to various embodiments, for example, with different levels of permissions, different groups and subgroups, different security levels, and so forth.

Some embodiments pertain to the use of code generators for a variety of purposes, including, but not limited to the generation of values for a particular code segment, defining sample code templates used for building sample codes for a physical sample, or combining various sample code segments together to form a sample code. For example, a code generator may generate the specified segment values by executing its function using input values from a variety of data sources, including, but not limited to, queries on a database or metadata input from the physical sample. Code generators may be used for quality or integrity control segments, and also for segments with a dynamic value.

Some embodiments also allow for the controlled use of metadata solely on an authorization basis of the user. For example, code samples may include a segment identifying the ownership or source of the physical sample, which may be accompanied by user specification segments identifying the user of the code sample in more detail. For example, the user specification segment could consist of an intermediate such as a distributor or retailer, a customer, consumer, controller, customs, or could use definitions such as a patient, practitioner, pharmacist, inhabitant, or other. Such a user segment could specify that special metadata concerning the sample could only be accessed by the authorized user of the sample code, requiring that user to authorize or grant specific access to that sample.

Some embodiments also allow for partial sharing of sample code segment values by several codes if the coded samples share a portion of their specification metadata for identification. This could enable the owner or user of the sample codes additional error-checking or verification options in determining if the code samples are valid, or could enable the owner or creator additional processing options based on the shared metadata.

Some embodiments allow for the combination of sample codes for several samples to identify a new sample based on an existing relationship between the combined samples. For example, the combination of the samples can preserve the origin of the samples as well as any specification criteria related to the intermediaries of the combined samples.

BRIEF DESCRIPTION OF THE DRAWINGS

The following are exemplary, non-limiting embodiments, wherein:

FIGS. 13-15 show an example of labelling wine bottles 88 with sample codes according to some embodiments.

DETAILED DESCRIPTION

Embodiments relate to a 'Identifying Connecting System (ICS)', which stands for the (mutual) connection of the physical world to the digital world. For example, ICS may allow for:

1. Unique identifying coding: digital enabling/facilitating and administering of a method applied for the purpose of worldwide unique identifying coding of goods, documents, information sets, services, locations, persons and animals.

2. Multilingual specification: enabling/facilitating and administering of a method which can be used for worldwide and multilingual specification of the attributes of the coded goods, documents, information sets, services, locations, persons and animals stated under 1. These attributes can for instance be shown in the form of videos, images, sounds (for instance voice), codes, digits and numbers. The multilingualism of the specifications (or metadata) use is made here with a register of keywords with ID code.

3. Opening and linking processes: making possible/facilitating and administering a method used to open and link processes with the codes and associated metadata of goods, documents, information sets, services, locations, persons and animals. With a view to the information logistics, use is made here of generic process models, which are specified depending on the form of organization of the relevant situation.

The technology-independent ICS system according to embodiments provides added value in the form of nine product market combinations (PMCs). These PMCs are all embedded in the generic ICS idea and partially overlap each other. Nine main groups of international, national and local PMCs are distinguished here:

G2G: Government to Government;
G2B: Government to Business;
G2C: Government to Citizens;
B2G: Business to Government;
B2B: Business to Business;
B2C: Business to Consumers;
C2G: Citizens to Government;
C2B: Consumers to Business;
C2C: Consumers to Consumers.

Specific user groups ('communities') are then distinguished within these main groups of PMCs, such as "Music and Entertainment", "Transactions and Banking", "News and Advertising", "Import and Export", "Permits and Civil affairs", "Assignment of rights and security such as within the scope of Healthcare" and so on. Due to the overlap between the PMCs the generic quality is an important starting point.

Figure 1:
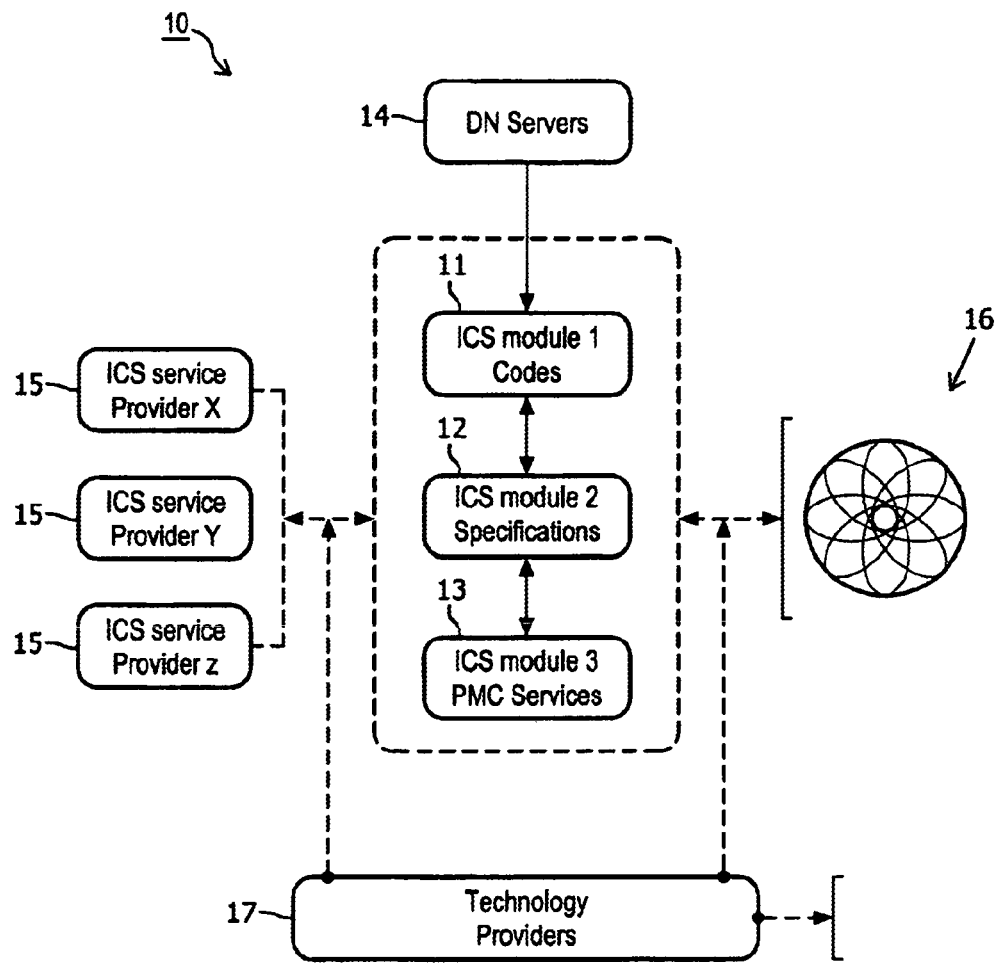
FIG. 1 shows a schematic outline of an environment in which embodiments are implemented according to an embodiment.

ICS system 10, which is shown in schematic form in FIG. 1, has the following main structure, which is made up of the following associated generic modules:

ICS module 1: 'Code': code generator 11, which represents the system used for identifying coding of goods, documents, information sets, services, locations, persons and animals.

ICS module 2: 'Specifications': specification module 12, which represents the specification of coded objects, using metadata in the form of text, digits, image and sound which are connected to coded relevant items.

ICS module 3: 'Services/data logistics': service modules 13 support ICS service providers 15 and ICS User Groups 16 in the application and administration of ICS for the different PMCs.

Figure 4:
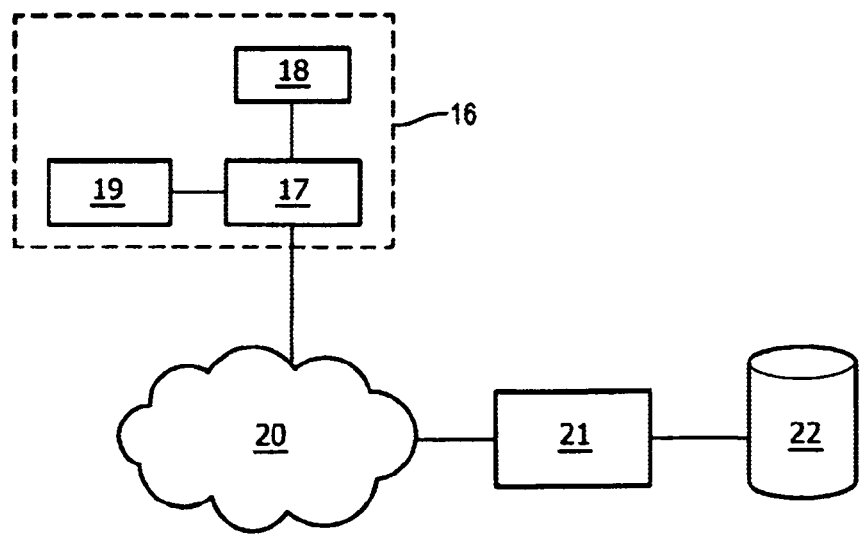
FIG. 4 shows a schematic outline of the individual use of the ICS codes according to an embodiment.

FIG. 1 further shows other parts of the system which play a part, such as a Domain Name Server 14, and technology providers 17 which, optionally under privacy-protected conditions, provide user groups 16 with the codes in a determined form (barcode, matrix code, QR code, MS tag, RPM tag, etc.), and further technical support means, such as associated scanners and software (see also FIG. 4 and the description thereof below). The World Wide Web generally forms the context of the ICS concept, while servers for storing and/or processing of host-identifying data, such as a domain name or IP address, and back offices form the (authorized) owners of supply for code generator 11 and specification module 12. Service providers 15 and User Groups 16 of the ICS system have a significant overlap. The distinguished ICS modules 11-13 may have a generic design to increase the ease of rollout of embodiments. For example, use may be made of existing standards and technologies to implement the ICS concept. These are provisions for presentations and prints of the ICS code in the form of 1D barcodes, 2D barcodes (QR code, Matrix code, Microsoft Tag and eventually RFID), as well as applications for (mobile) scanning and translation of ICS codes. The quality and cohesion of the modules and the convenience of use are constantly monitored by an (independent) expert organization. One possibility here is to envisage applying error correction algorithms BCH codes, such as Reed-Solomon algorithms (these can correct up to 60% of the damage of a 2D matrix code).

ICS Module 1, ICS Code System

Figure 2:
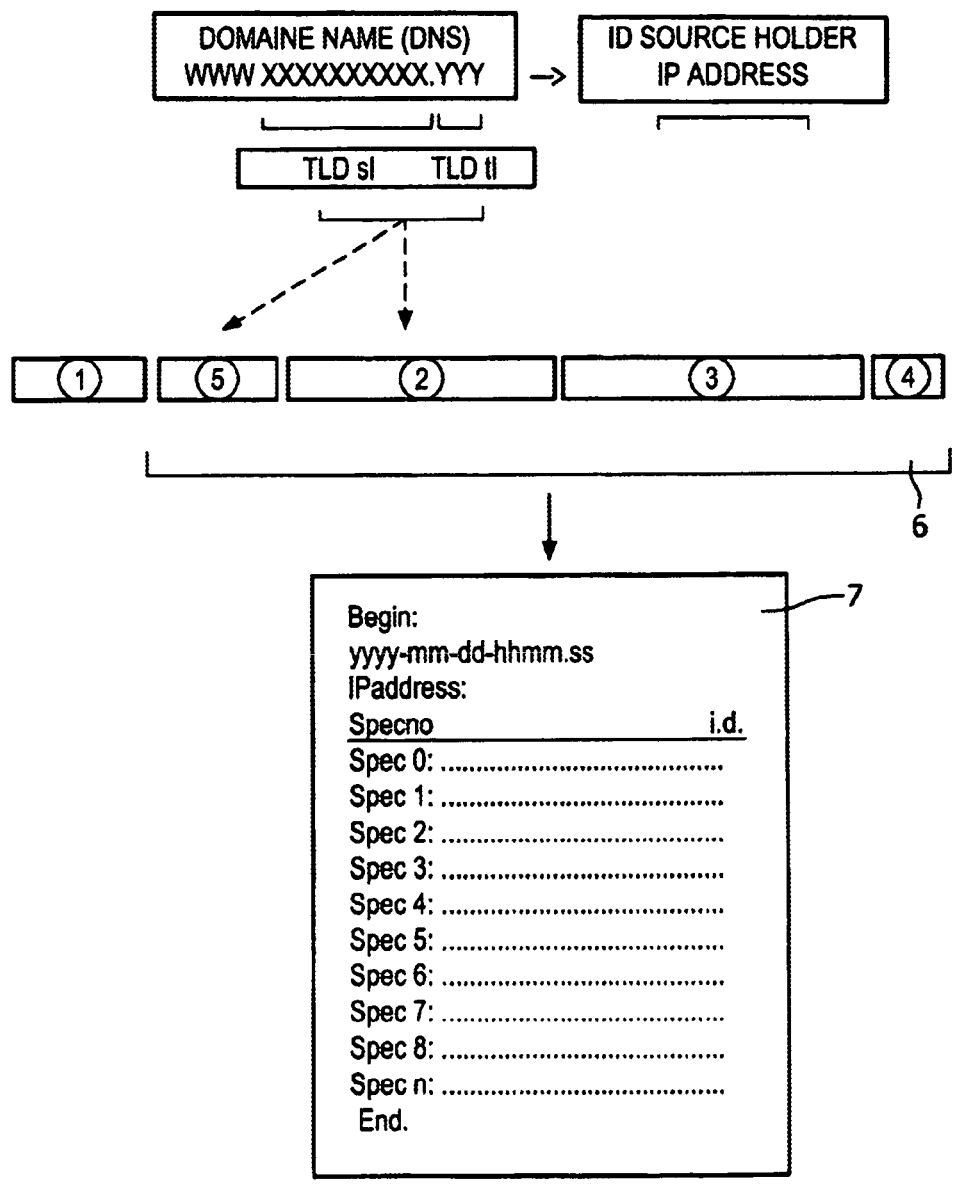
FIG. 2 shows a schematic representation of the generic structure of an ICS code according to an embodiment.

The ICS code system forms the core of the ICS concept and is structured according to the framework for ICS code 6 shown in FIG. 2. Five segments 1-5 are distinguished within the ICS framework, the segments being implemented subject to the desired functionalities. These are specified below:

ICS Code segment 1. The "www" segment. The functional and technical relation/the connection may be made with the owner of ICS by using the "www" protocol using the World Wide Web.

ICS Code segment 2. The host-identifying segment, in particular the Domain Name (DN) segment. The relation/the connection with the domain names may be made in accordance with ICANN standards. During the structuring of ICS codes by authorized users a relation is established with DN servers 14 (NB: IP addresses are included in ICS specifications as fixed specification category. Based on communication protocol HTTP 1.1, an IP address can accommodate a plurality of domain names.

ICS Code segment 3. The serial letters/digits segment. By using numerical and alphanumerical symbols, objects may be uniquely identified and classified according to some embodiments.

ICS Code segment 4. The (optional) code checking segment. The quality of the representation/appearance and of the scanning technology of the code in the form of characters and symbols, such as the 1D barcode, the 2D barcode (QR code, Matrix code or Microsoft® tag) or RFID, may be checked for correctness and completeness.

ICS Code segment 5. The optional service segment. This segment comprises the host-identifying information, such as the domain name and/or the IP address, and additional numerical or alphanumerical codes of intermediaries (for instance for a newspaper: DN, date, location code: page number and coordinates). Intermediaries may be provided with the option of offering and following (track & trace) physical and digital products and services of other owner holders/chain partners. By using the optional service segment, it may be possible for intermediaries to obtain a maximum return from their own added value in combination with the added value of the partners.

Codes 6 are related to (multilingual) metadata 7. The multilingualism is supported from a register with terms which are provided with an ID code. Eight functional variants are distinguished within ICS, independent of the generic optional code segment. In order to arrive at a choice for the most suitable variant a selection tree may be used for support purposes. Using the selection tree, a party may be asked:

Question 1. Are you an owner holder or authorized representative?

Question 2. Do you have a registered domain name?

Question 3. Are you an intermediary or owner holder?

Question 4. What is to be coded: goods/services, documents, persons, data sets?

Question 5. Do you wish to organize and group the coded information?

Question 6. Do you wish to secure the data?

Question 7. Do you wish to be associated with standards such as GS1 or WDO?

Question 8. Do you have experience with ICS?

Depending on the (pre-programmed) answers, one of the code variants may be suggested (by the code module) for application. As a derivative of the situation of the initiator (questions 1-3 and question 8) and the desired functionalities (questions 4-7) the ICS code system has different ICS code variants 6 (see FIG. 3) that may be used. This is irrespective of whether or not the optional code segment 5 is used. For example, the following set of ICS variants may be used:

ICS 1A1: Stable, Parallel, Basic SPB
ICS 1A2: Stable, Parallel, Slash SPS
ICS 1B1: Stable, Switch, Basic SSB
ICS 1B2: Stable, Switch, Slash SSS
ICS 2A1: Dynamic, Parallel, Basic DPB
ICS 2A2: Dynamic, Parallel, Slash DPB
ICS 2B1: Dynamic, Switch, Basic DPB
ICS 2B2: Dynamic, Switch, Slash DSS Different variables are thus recognized at four levels. Two sub-categories are distinguished at level 1:

ICS 1 Stable: for allocating fixed codes;
ICS 2 Dynamic: for allocating dynamic codes (with respect to security).

Two sub-categories are distinguished at level 2:

ICS xA: Parallel, the domain name (DN) is not changed;
ICS xB: Reverse/switch, the top-level domain is moved to location 1, followed by the second and third levels (e.g.: "Heineken.nl" becomes "nl.Heineken").

Two sub-categories are distinguished at level 3:

ICS xy1: Basic: the structured code, in segment 3 provided only with digits and letters and in accordance with a fixed algorithm, is provided with a quality control digit;
ICS xy2: Slash: the serial number is cut into three numbers by means of a separator such as a full stop or a slash so that categories are distinguished by the user, and is provided where necessary with a quality control digit in accordance with a fixed algorithm.

It is the case in all variants that field 4 enables a (quality) control, for instance according to the formula:

X=Σ values letters/digits DN field 2 (alternatively for instance IP-address of domain name holder);
Y=Σ values letter/digits Serial no. field 3
Field 4 (qq)=last two digits of X+Y.

The code variants of ICS code 6 are discussed briefly below with reference to the code segments. ICS 1A1: Stable Parallel Basic (excluding optional code segment): This code variant uses four code segments. The GS1 code (data bar from omni-directional to expanded stack) can for instance be inserted into code segment 3. In this variant, ICS code 6 has the following structure:

www.xxxxxxxxx.yyyy.pppppppppppppp.qq wherein
www is ICS code segment 1; xxxxxxxxx.yyyy is ICS code segment 2;
pppppppppppppp is ICS code segment 3 and qq is ICS code segment 4.

An example of such an ICS code 6 is:
wwvv.Kruidvat.nl.00000000000001.68, wherein www.Kruidvat.nl can be converted to the IP address 213.247.48.238. This ICS code 6 can then be connected to a stored specification/metadata of image, sound, digits and letters (in a variant even in multiple languages):
yyyy-mm-dd-hh.mm.ss
Owner: Kruidvat B. V.
Manufacturer: Marel B.V.
Spec 0: Kruidvat Paracetamol 1000 mg
Spec 1: box
Spec 2: 10 units
Spec 3: THT 2013.07
Spec 4: Charge no.: 125647
Spec 5: Image: Kruidvat.nl/photo/medication/0000001
Spec 6: Information leaflet http://db.cbg-meb.nl/Infoleaflets/h33987.pdf
Spec 7: IPv4 213.247.48.238
Spec 8: GS1 no. 8717333096953

Within the following variant ICS 1A2: Stable Parallel Slash use is made of the same four code segments 1-4. In code segment 3 an option is provided, via the separator such as a full stop or a slash, for organizing data for item groups (also in respect of possible coupling to data in back office of owner holder). ICS code 6 then appears as follows:
www.xxxxxxxxx.yyyy.ppp/pppp/pppppppp.qq, wherein the parts of code segment 3 indicate for instance a main category, sub-group and serial number, such as Own brand/Medicines/paracetamol. In an example ICS code 6 can then appear as follows:
www.Kruidvat.nl.001/0001/0000001.68

In a further embodiment (1B1 Stable Switch Basic) the host-identifying code segment, in particular the DN code segment 2, is modified for security reasons. ICS code 6 then appears as follows:
www.yyyy.xxxxxxxxx.pppppppppppppp.qq The top-level domain (yyyy) and the own domain name (xxxxxxxxx) are thus switched here in DN code segment 2. ICS code 6 then for instance becomes:
www.nl.Kruidvat.0000000001.45

The same variant can also be given for the slash code, then designated as 1B2 Stable Switch Slash. In this variant ICS code segment 3 comprises a variant with separator such as a slash:
www.yyyy.xxxxxxxxx.ppppp/ppppp/pppp.qq
ICS code 6 then for instance becomes:
www.nl.Kruidvat.01/0001/0000001.45

In order to increase the security and confidentiality of data sets, the Dynamic variant is incorporated in the ICS concept. The dynamic factor is inserted into code segment 3 and represents the time code, which derives its dynamic element for instance from the Date & Time Zones (DTZs). In order to gain access to the associated data set the user first receives so-called key information (DTZ plus year, date and time of transmission), with which a dynamic time code is activated which is the same as and has the same dynamic rhythm as the data set for opening. The DTZ is defined as UTC (Universal Time Code)+/−aa.bb, wherein aa indicates the difference in hours relative to UTC and bb the possible difference in minutes (i.e. 0, 30 or 45 minutes). The dynamic variant can be applied to all the above stated variants at levels 1 and 2 (basic/slash; and parallel/switch). In the slash variant the dynamic time code can be inserted as one of the separated parts of code segment 3, for instance after the final slash.

Figure 3:
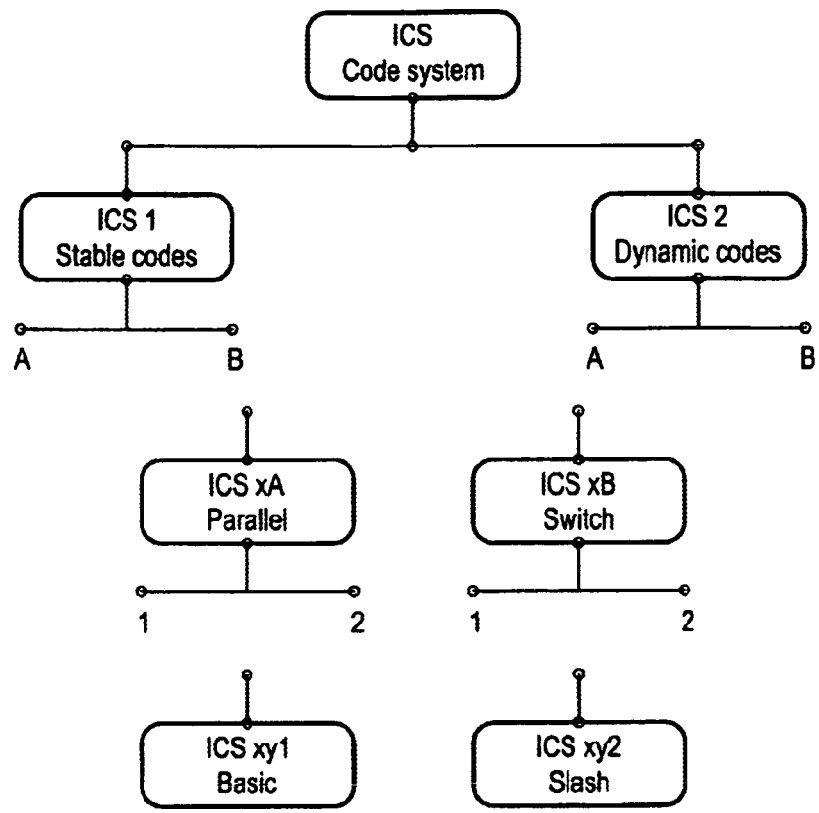
FIG. 3 shows an outline of different variants of the ICS code according to an embodiment.

As shown in FIG. 3, the insertion of an optional segment 5 (or service segment part) between segments 1 and 3 is implemented in a further embodiment within the ICS concept. Intermediaries are hereby provided with the option of offering and following (or tracking & tracing) physical and digital products and services of other owners/product holders/chain partners. Thus, it may be possible for intermediaries to obtain a maximum return from their own added values in combination with those of partners.

ICS code 6 may then have the following structure:
www.aaaaaaaaa.bbbb.kkkkkkkk.XXXXXXXXX.yyyy. pppppppppppppp.qq wherein
aaaaaaaaa.bbbb.kkkkkkkk forms optional segment 5, wherein aaaaaaaaa.bbbb represents the domain name of the intermediary and kkkkkkkk is a serial number of the intermediary. The serial number can also exist in a variant with different parts, for instance separated by full stops or slashes.

The other parts of ICS code 6 may correspond to any of the above described embodiments. The metadata linked to the ICS code can be stored at the intermediary and/or at the owner holder.

Optional segment 5 can for instance appear as follows:
www.Telegraaf.nl.2009.04.14/1000654/3/4,6
which is the coded variant for data of an intermediary, in this case "de Telegraaf", with Publishing date/charge number/page 3/column 4, row 6. The result is that the data traffic initiated in the newspaper for instance does not flow directly to an advertiser or the journalist who wrote the article, but instead flows through the intermediary. Through analysis of this data, the intermediary can not only provide current market information but can, as is the case in supermarkets, also begin to work on forms of "shop floor management" and shelving plans (a more refined form of page location management), and thus create value for both the reader and the information owner. Clarity is provided as to which location (page, row and column) and which combinations with news sections increase the chance of a hit.

In another example ICS code 6 appears as follows:
www.ics-online.org.00001.ABNAMRO.00000000001.1, which is printed as QR code on a business card. This ICS code 6 is obtained by scanning the barcode, the matrix code, the QR code, the Microsoft tag or the RFID tag, after which the metadata associated with this code can be retrieved via the website of ics-online.org, optionally after gaining access via voice recognition. The metadata set can then be as follows:
Owner: Contract management ICS B.V.
Party: IBM (IP address) 129.42.60.216
Person: DiGID O9DW5NM7
Role code: CPO
Photo: Fotoshop.nl.O9DW5NM7.56

Voice sound: Voicestruct.de.O9DW5NM7.58 (for optional voice recognition)
Kees de Tekenaar
Purchasing Manager
KDT@ABNAMRO.NL
0031106122345
0031651888765
ICS Module 2, ICS Specifications As shown in FIG. 1, a specification module 12 is adapted to specify the metadata. Specification categories may be successively distinguished which are implemented by the service provider and user, optionally with support. A register is provided for support purposes during specification in which terms are provided with an ID number. Where possible, each term is provided in multiple languages. In addition to the specifying function, categories are provided in the specification module through which the relation with related information owners is made in the form of images and/or sound. Owing to the design of specification categories and the subdivision of the data and the multilingual register, data sets can be adapted via filtering to the role and information needs of the target groups. Thus, generated metadata may be stored in a database which offers secure access via for instance a web location which can be found by decoding ICS code 6.

ICS Module 3, ICS PMC Services

Provisions based on generic building blocks are supplied as module 3 of the ICS concept for the purpose of offering, administering, evaluating and updating services. Due to the generic character of the core of many different services, these service concepts are based on generic process models which can be utilized in the specific situations of the Users and User Groups. FIG. 4 shows a schematic outline of a possible use of ICS codes 6 by a user. The user, a participant in an ICS User Group 16, possesses an optionally secure intelligent reading unit, which comprises a processor 17. Processor 17 is for instance a (portable) computer or a mobile phone (smartphone), and is provided with memory and a software program for driving processor 17. Processor 17 is connected to a scanner unit 18 and an output unit 19, for instance a screen or a printer. Scanner unit 18 is adapted to the form of ICS code 6, for instance a barcode scanner or an RFID scanner. In a further alternative the scanner unit 18 is a camera which forms part of a mobile phone, wherein ICS code 6 can be determined from an image, for instance a QR code viewed using the camera (for instance using a special software program available at the moment in a large number of mobile phones). ICS code 6 can now be used by processor 17 to determine for instance from which domain name the metadata associated with the read ICS code 6 can be obtained. By using a network such as Internet 20 and a server 21 associated with the decoded domain name, the processor can then retrieve the metadata from a database 22 administered by server 21. Processor 17 can then display the obtained metadata on output unit 19.

According to some embodiments, a method for coding an object (such as goods, documents, information sets, services, locations, persons, animals) with a code 6 is provided in various optionally secure embodiments as described above. The code comprises for instance a domain name part 2 (ICS code segment 2) and an identifying part 3 (ICS code segment 3), wherein the domain name part can be translated to for instance a web location 21 where specifications or metadata can be retrieved in the form of text, digits, images and/or sound associated with the object from identifying part 3 of code 6.

The method further comprises of arranging code 6 in a machine-readable format, such as a barcode, matrix code, QR code, Microsoft tag, RFID code and so on. In an embodiment domain name part 2 is linked directly or indirectly, for instance via a DNS server 14, to an identity of an owner/holder. Domain name part 2 can be converted into an IPv4 or IPv6 address via a DNS server 14 (see FIG. 1).

As in the above described embodiments, code 6 comprises a checking part 4 which consists of a predetermined mathematical processing of code 6. Checking part 4 is an option in code 6, and is not required. In a number of the above described embodiments, code 6 also comprises a service segment part 5. Service segment part 5 is an addition to domain name part 2 as a reference to a determined service. In a number of described embodiments code 6 may be a dynamic code, wherein a part of code 6 changes subject to a dynamic quantity such as time.

In a number of embodiments the host-identifying part, in particular domain name part 2, is an encrypted version of a domain name associated with web location 21 for retrieving metadata. Examples hereof are the above described 'switch' class codes, wherein the top level domain and domain name are switched. More complex forms of encryption can also be applied.

In a number of the above described embodiments, identifying part 3 comprises one or more sub-fields which are separated by a special character (for instance a full stop or a slash).

In more general terms, an embodiment provides a method for issuing a code for an object, comprising receiving a domain name and granting access to a system 10 with a code generator 11 and a specification module 12, which are adapted to implement any of the described embodiments. System 10 can further be adapted to validate for instance the received domain name. In addition, a service module 13 can form part of system 10 for the purpose of administering the system for issuing ICS codes 6. For the structuring of ICS codes 6 and specifications (metadata) the code generator 11 and specification module 12 can be adapted to retrieve data from a digital (owner) location or to receive data from other applications (for instance back offices or other).

Because the code system is of a technology-independent nature, the method and the system according to the different embodiments can be implemented in different types of hardware and software. The hardware may take the form of a computer system which can comprise different implementations such as central servers with associated peripherals or different standalone processor systems which communicate with each other. Embodiments may also involve a computer-readable medium with computer-executable instructions. When the computer-executable instructions of the medium are loaded, the computer system is able to execute the described functionality.

Figure 5:
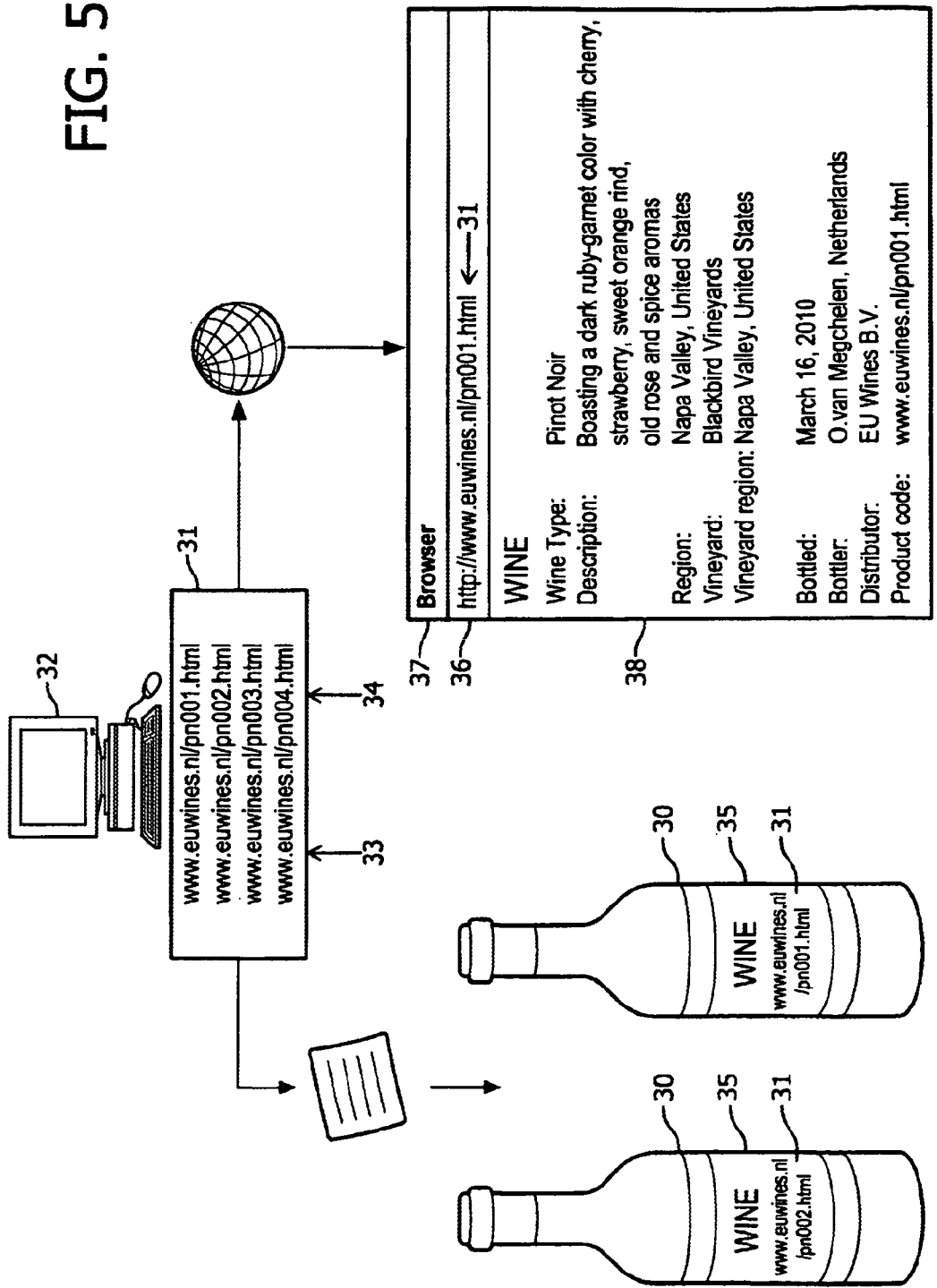
FIG. 5 shows a schematic view of a exemplary method for coding wine bottle samples with a unique sample code according to an embodiment.

FIG. 5 shows a schematic view of a exemplary method for coding wine bottle samples 30 with unique sample codes 31 according to some embodiments. By means of a computer 32 which may be connected to a network and which may be part of a cloud-computing infrastructure, a series of unique sample codes 31 is generated, wherein each sample code 31 is to be attached to a wine bottle sample 30 to provide each bottle sample 30 with a unique fingerprint to be compared with a DNA profile. Each sample code comprises a host identifying code segment 33 and a bottle sample identifying code segment 34 which are mutually separated by means of a slash sign. The sample code 31 as such is printed on a label 35 attached to the respective wine bottle sample 30. Hence, the sample code 31 is clearly visible to sighted persons. Each sample code 31 moreover forms a unique, personal URL which can be entered into an address bar 36 of a web browser

37. The URL refers to a resource of information, in particular a web page 38 on which information is displayed which is specifically related to the matching wine bottle sample 30. The prefix "http://" can be automatically be added to the sample code by the web browser 37. In this example, both product properties (wine type, description, region, vineyard, vineyard region) and process properties (bottled, bottler, distributor) are displayed. Moreover the physical product sample code 30 is displayed on the web page 38 for verification purposes.

Hence, each sample code 30 applied has a dual functionality, whereby the sample code 30 may be used for worldwide uniquely coding/labelling a wine bottle sample 30 and is moreover adapted to represent a URL for retrieving and displaying sample specific information.

Figure 6:
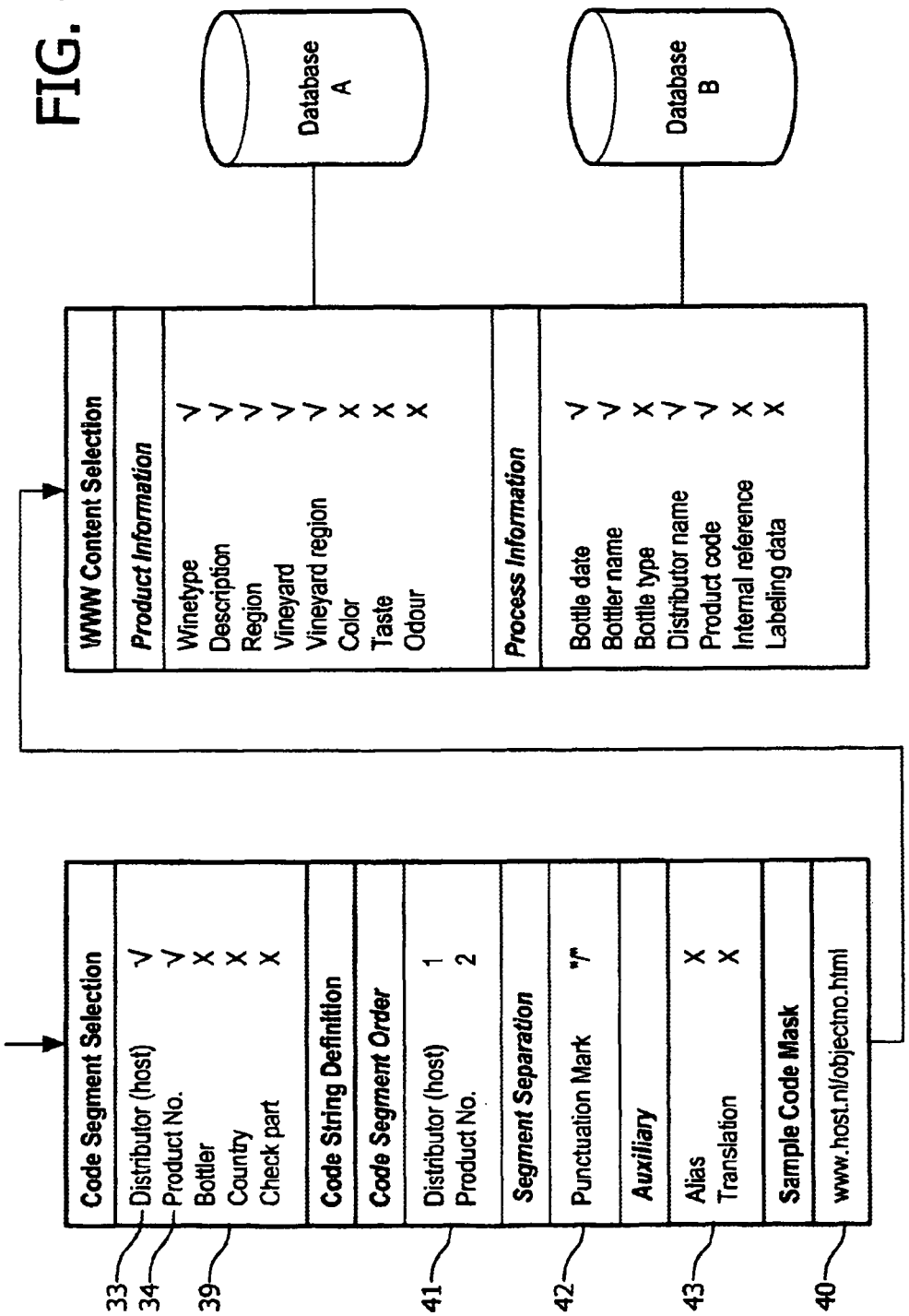
FIG. 6 shows a method for compiling a physical product sample code, in particular a sample code as shown in FIG. 5, and for building a web page related to said physical product sample code according to an embodiment.

FIG. 6 shows a method for compiling a physical product sample code, in particular a sample code 31 as shown in FIG. 5, and for building a web page 38 related to said physical product sample code 31 according to an embodiment. A code issuing part, commonly the owner of the top level domain name which is incorporated in the sample code to be compiled, first defines the code segments 39 to be used for building the sample code. In this example, the host has selected two segment codes to be used for building a sample code, namely a distributor (host) related code segment 33 and a sample identifying code segment 34. Subsequently, the code issuing party defines the template 40 to be used for building a sample code based upon the code segments selected. Hence, a priority order 41 is given to the selected code segments 33, 34, a separation character 42 is defined, and auxiliary settings 43 are defined. By means of the auxiliary settings 43 it can be decided whether or not the sample code has to be converted into an alias and/or has to be translated into another language. The result of defining the code segments and the string definition is a sample code mask or template 40 which can be used to incorporate metadata into the sample code mask to form a usable sample code 31, as shown for example in FIG. 5. The metadata may be extracted from one or more databases (not shown). In this particular example, the host identifying code segment 33 is a static code segment which is identical in each sample code. Hence, the host identifying code segment 33 can be defined in advance. The sample identifying code segment 34 is however dynamic in the sense that this code segment 34 is different in each sample code. The sample identifying code segments 34 can be extracted from a database and/or can be generated by means of a code generator. Each combination of separated code segments defining the sample code as such is unique, which facilitates tracking and tracing of the physical product sample to which the sample code is attached.

In addition to the definition of the sample code, the content of a web page 38 related to each sample code is defined in advance as shown for example in FIG. 5. In this example a field selection can be made in product information to be displayed and process information to be displayed. The available product information is stored in database A and the available process information is stored in database B. Since, a field can be either selected or deselected it can be selectively decided which information will be displayed on the web page 38.

Figure 7:
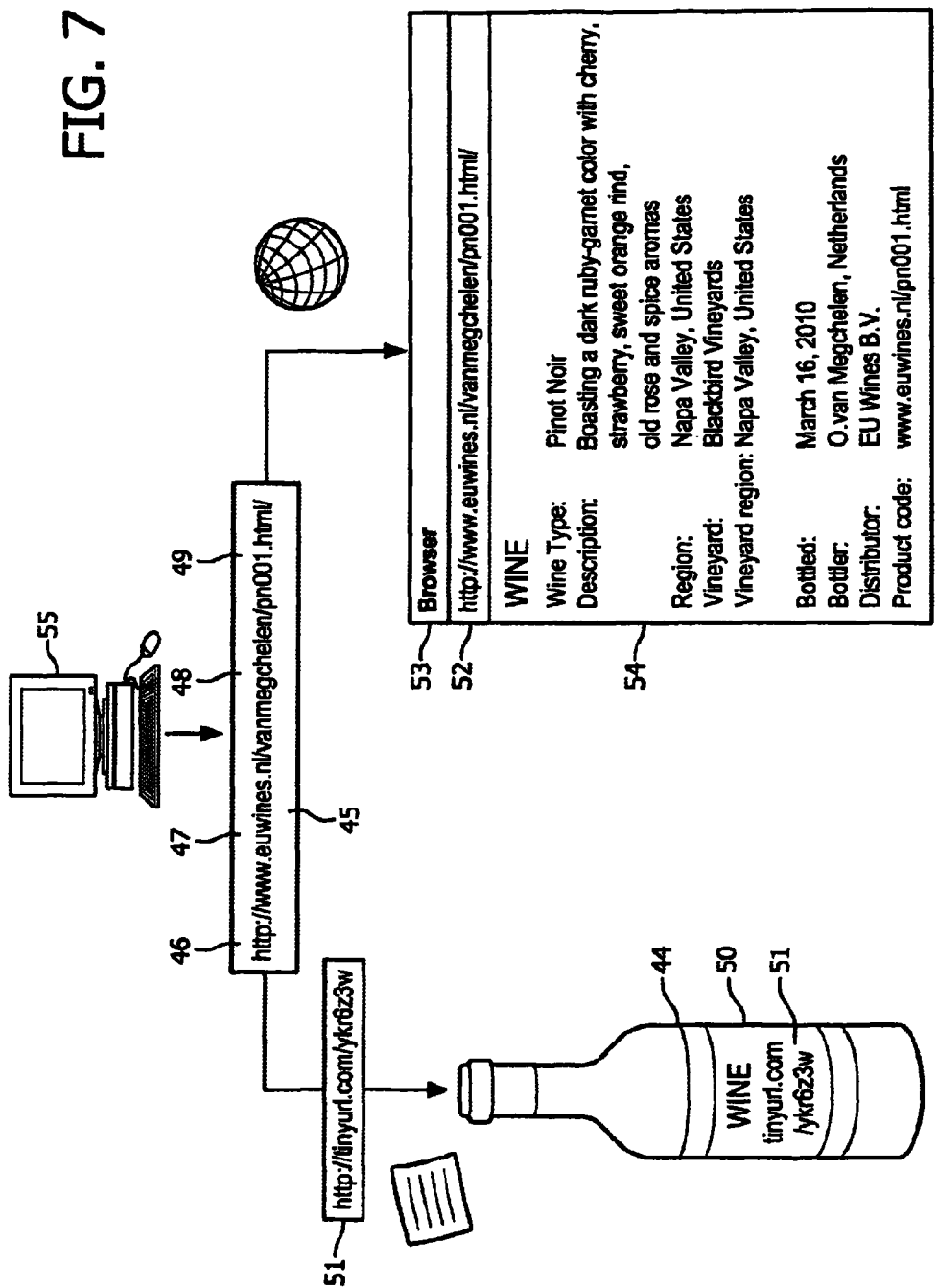
FIG. 7 shows a schematic view of another exemplary method for coding wine bottle samples with unique sample codes according to an embodiment.

FIG. 7 shows a schematic view of another exemplary method for coding wine bottle samples 44 with unique sample codes 45 according to some embodiments. The method shown in FIG. 7 is substantially comparable with the method as shown in FIG. 5. The original worldwide unique sample code 45 to be generated by means of a computer 55 comprises a prefix code segment 46, a distributor (host) identifying code segment 47, a bottler identifying code segment 48, and a bottle sample identifying code segment 49. The code segments 46, 47, 48, 49 are separated by means of a slash sign. Moreover, a slash sign is positioned behind the last ordered code segment 49. Since the original worldwide unique sample code 45 ("http://www.euwines.nl/vanmegchelen/pn001.html") is relatively long to be printed on a label 50 of the bottle sample 44, the relatively long sample code 45 is shortened by means of a URL shortening module (not shown) resulting in a more concise alias sample code 51 ("tinyurl.com/ykr6z3w") which is printed on the label 50 (to be) attached to the wine bottle sample 44. The shortened URL which is printed on said label 50 can be entered into an address bar 52 of a web browser 53 which will redirect the URL to original URL (original sample code 45) to retrieve additional information specifically relating to the wine bottle sample 44 to which the sample code 45 is attached. In this case the tailored information is displayed as a web page 54, though it is also conceivable that the URL refers to one or more downloadable digital files.

Figure 8:
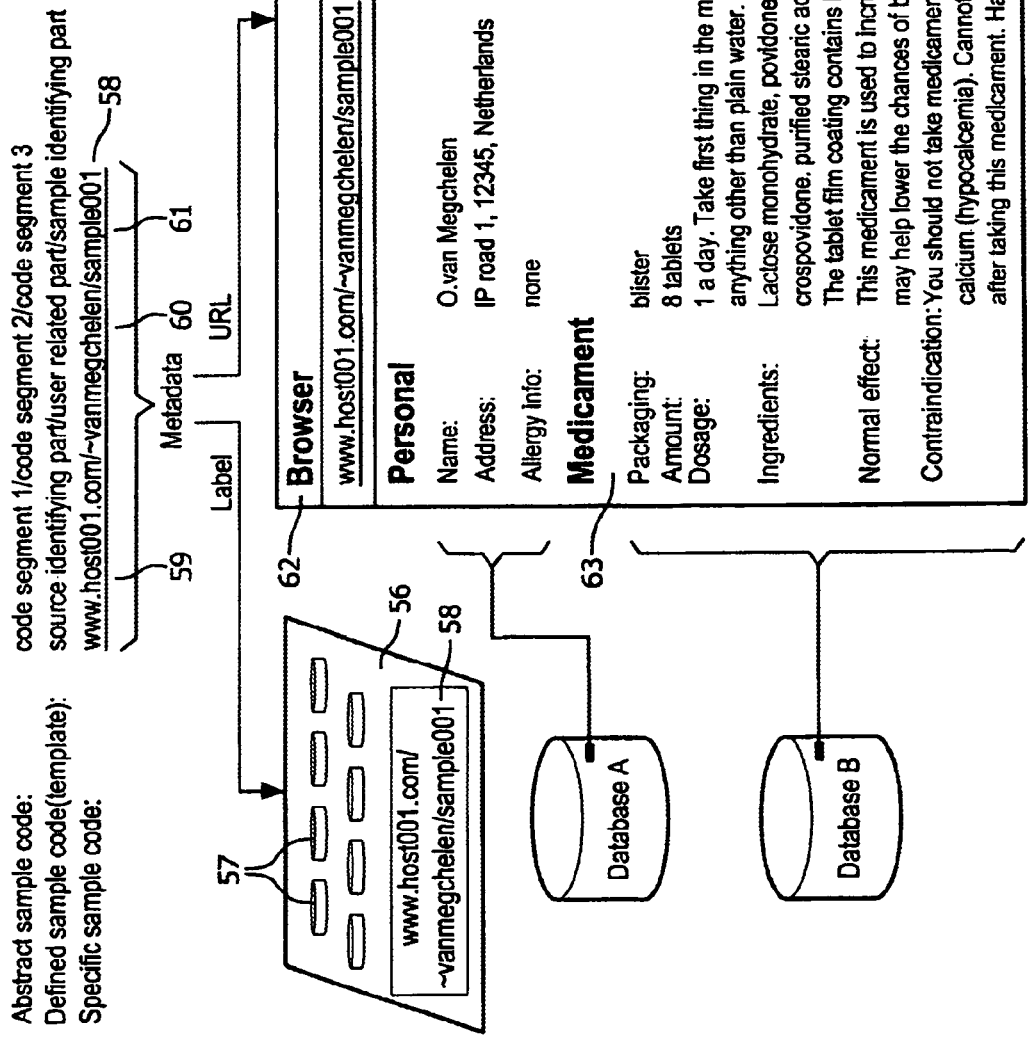
FIG. 8 shows a schematic view of yet another exemplary method for coding a blister packaging for tablets with a worldwide unique sample code according to an embodiment.

FIG. 8 shows a schematic view of yet another exemplary method for coding a blister packaging 56 for tablets 57 with a worldwide unique sample code 58 according to an embodiment. As indicated in FIG. 8, the sample code 58 comprises three code segments, which are defined as a owner identifying part 59, a user related part 60, and a sample identifying part 61. In case these code segments 59, 60, 61 are specified and provided with metadata one could generate the following unique sample code 58: 'www.host001.com/~vanmegchelen/sample001'. This sample code 58 both forms a code to be attached to the blister packaging 56 itself as shown and forms a URL which can be entered into a web browser 62 to gain access to additional information relating to that specific blister packaging 56. Since at least a part of the metadata of the sample code 58, in particular the owner identifying part and the user related part, will generally be recognized by the user when reading the sample code 58, the user can easily verify whether the right blister packaging has been obtained. In the event that another user name is incorporated in the sample code 58 that is not related to the particular user, the user would likely mistrust said blister packaging 56 which could prevent improper use of the blister packaging and improper taking of the tablets 57, which is favorable from a health/safety perspective. The information 63 relating to the specific blister packaging 56 and the tablets 57 contained by the blister packaging 56 can be retrieved via Internet by the user by using the sample code 58 as URL as mentioned above. The content of the information 63 can be extracted from several databases. In this case, selective personal information relating to the user of the blister packaging 56 can be extracted from database A, while selective information relating to the blister packaging 56 and the tablets 57 can be extracted from database B. The layout of the information 63 displayed may be defined by a programming script, such as a HTML script, a CSS script, et cetera.

Figure 9:
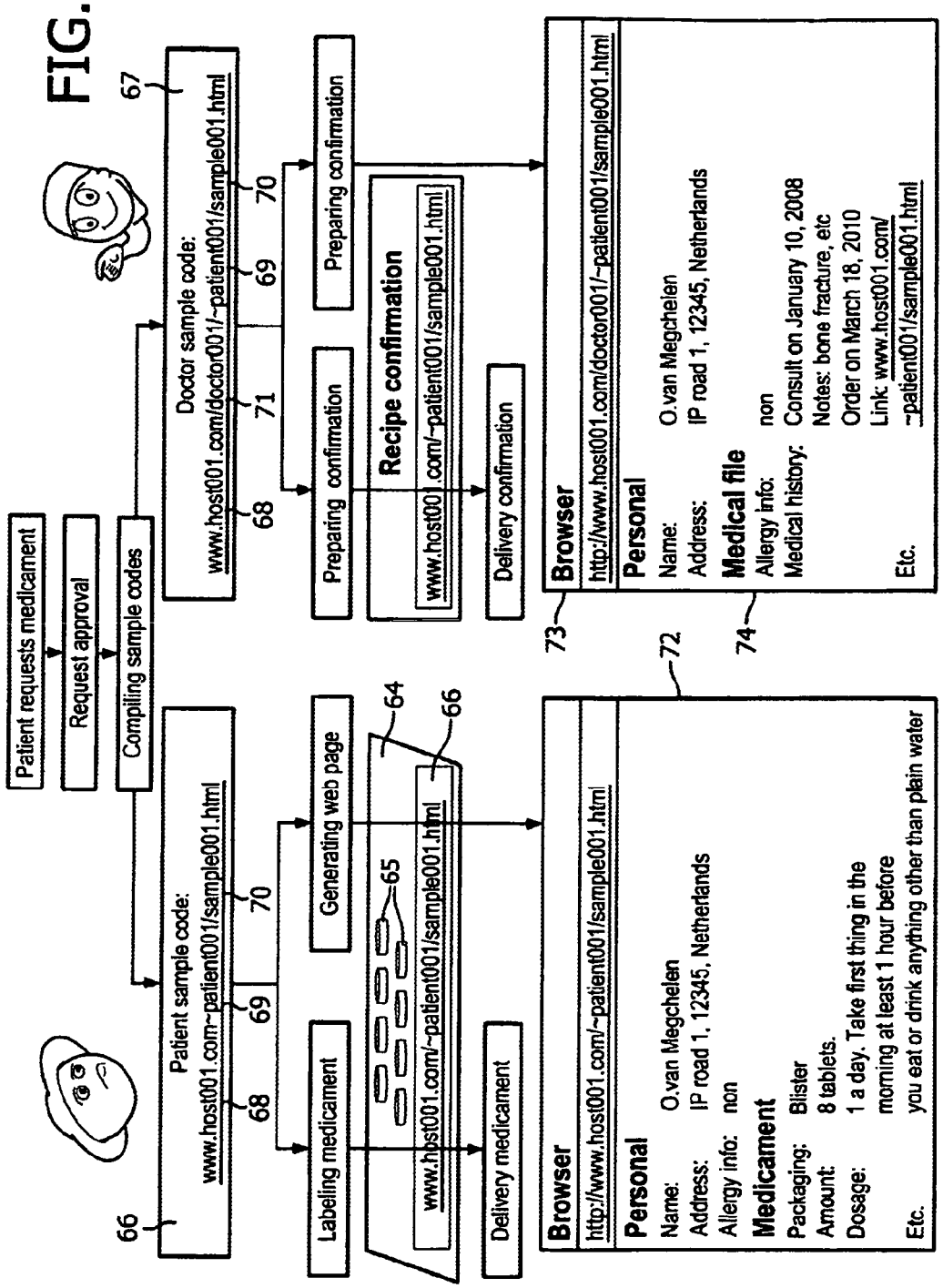
FIG. 9 shows a schematic view of still another exemplary method for coding a blister packaging for tablets with a worldwide unique sample code according to an embodiment.

FIG. 9 shows a schematic view of another exemplary method for coding a blister packaging 64 for tablets 65 with a worldwide unique sample code 66 according to an embodiment. In case a patient requests the particular blister packaging 64 for medical use, this request is commonly examined by a pharmacy or a doctor. After approval of the request a blister packaging 64 can be delivered to the patient after being coded with a unique sample code 66. During the coding process two different sample codes are generated: a sample code for the patient 66 and a sample code for the patient's doctor 67. The sample code for the patient comprises a host related code segment 68, a user related code segment 69, and a sample number related code segment 70 which are stringed and mutually separated by means of a slash sign. The patient's sample code 66 is printed on the blister packaging 64. Moreover, the patient's sample code 66 is a URL via which the patient can obtain access to a personal web page 72 containing generic information about the requested tablets 65, personal information about the patient, and personal advisory information ('allergy information') with respect to the requested tablets 65 in the light of the patient's medical file. The doctor's sample code 67 comprises—like the patient's sample code 66—the host related code segment 68, a user related code segment 69, and a sample number related code segment 70 which are stringed and mutually separated by means of a slash sign. The doctor's sample code 67 moreover comprises a doctor related code segment 71 positioned in between the host related code segment 68 and the user related code segment 69. As such, the doctor's sample code 67 is slightly different from the patient's sample code 66, and is also universally unique. The reason for compiling two different code for delivery of a single blister packaging 64 is that the doctor's sample code 67 forms a separate URL via which different information can be retrieved which is more relevant and/or only intended for the doctor rather than for the patient. The web page 74 which can be accessed by entering the doctor's sample 67 into a web browser 73 comprises personal information about the patient including the patient's medical file. The medical file comprises the patient's sample code 66 as a URL so that the doctor can easily check previous medication deliveries to the patient. Hence, the web page 74 to which the doctor's sample code 67 refers and to be opened with the web browser 72 incorporates the patient's sample code 66. The doctor's sample code 67 is commonly sent to the doctor for example by e-mail or by regular post or can be downloaded by the doctor from a personal digital web space.

Figure 10:
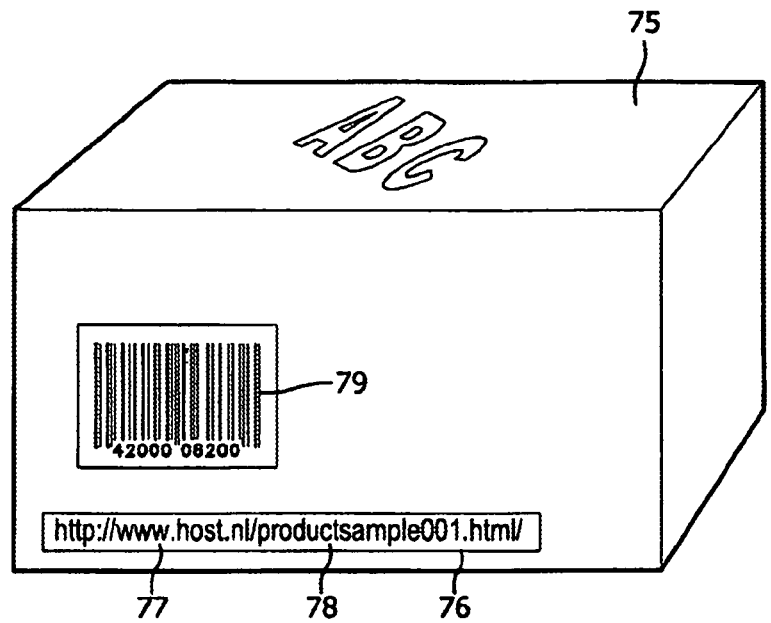
FIG. 10 shows a perspective view of a physical product sample provided with a unique physical product sample code according to an embodiment, said physical product sample code representing a URL referring to a unique digital location where particular information relating to the physical product sample can be found.

FIG. 10 shows a perspective view of a physical product sample 75 provided with a unique physical product sample code 76 according to an embodiment, said physical product sample code 76 representing a URL referring to a unique digital location where particular information relating to the physical product sample 75 can be found. The physical product sample code 76 comprises a sample string of a host identifying segment 77, and a sample identifying segment 78. Besides this unique sample code 76 acting both as universally unique tag and as reference to a digital location where further information can be found, the physical product sample 75 is provided with a conventional UPC barcode 79 (Universal Product Code) adapted to be scanned in a store for retrieving price related information and to keep control of the product store of said store in a conventional manner. However, each unique sample code 76 may be embedded in the financial and logistic software of the store, wherein different physical product samples of the same kind of product can be distinguished from another, which can lead to a more detailed and hence improved pricing control and stock control of the physical product samples to be sold.

Figure 11:
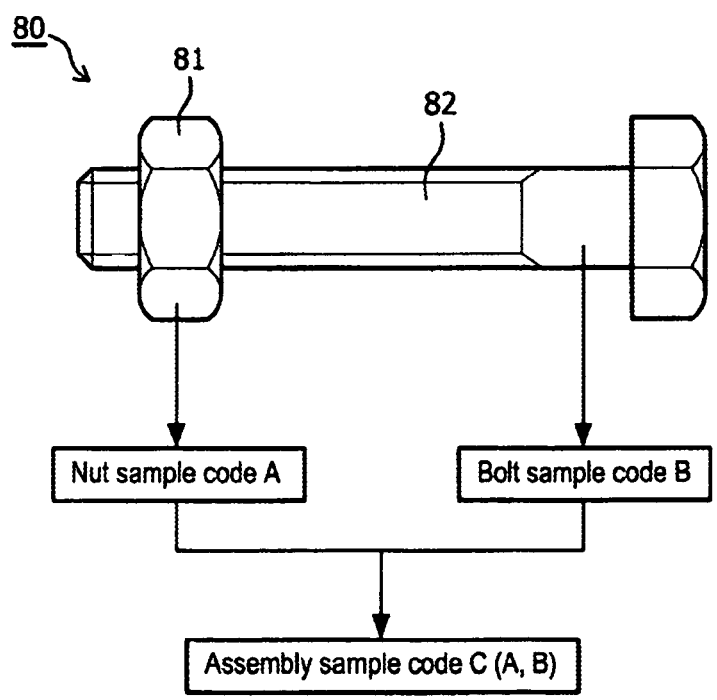
FIG. 11 shows a side view of an assembly of a nut and a bolt, which are coded by a sample code according to an embodiment.

FIG. 11 shows a side view of an assembly 80 of a nut 81 and a bolt 82, wherein the nut 81 is provided with a sample code A according to some embodiments, the bolt 82 is provided with a sample code B according to some embodiments, and the assembly 80 as such is provided with a sample code C incorporating at least a part of sample code A and at least apart of sample code B. Each of sample codes A, B, and C comprises a sample string of a host identifying code segment and a sample identifying code segment, wherein each sample string represents a unique URL for retrieving further information about the particular sample A, B, or C.

Figure 12:
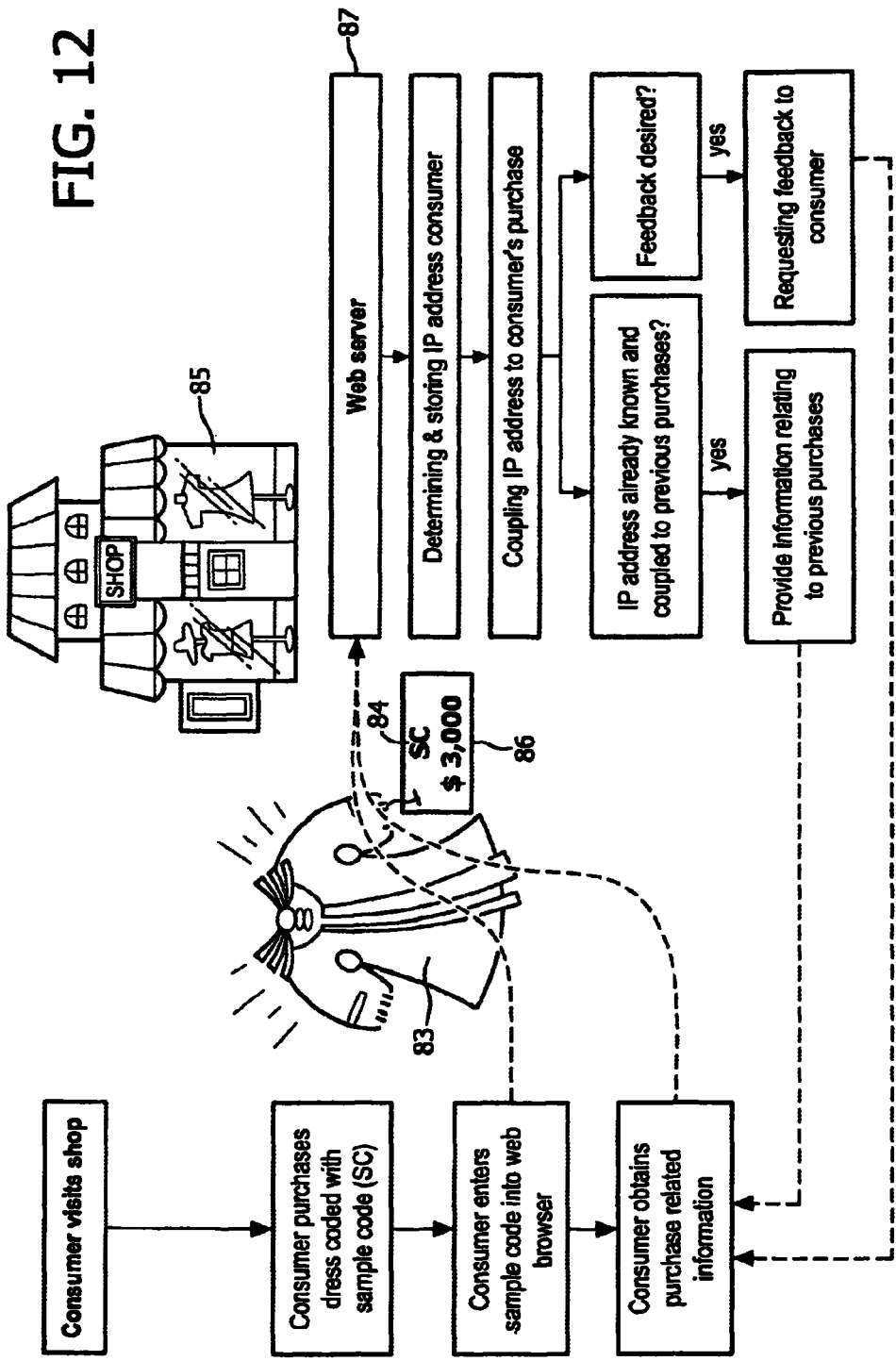
FIG. 12 shows a schematic view of a method for purchasing a good, in particular a dress, by using a sample code according to an embodiment.

FIG. 12 shows a schematic view of method for purchasing a good, in particular a dress 83, by using a dress sample code 84 according to some embodiments to identify the particular dress 83. As clearly indicated in FIG. 12 the consumer purchases a dress in a store 85, which dress is provided with a price tag 86 including the dress sample code (SC) 84. In line with the above embodiments the sample code represents a URL via which specific information relating to the particular dress sample 83 can be retrieved. To this end, the consumer enters the sample code 84 into a web browser installed on a computer (not shown) of the consumer, which creates a connection with the web server 87 of the store 85, after which the requested content can be displayed on a generated web page via the consumer's computer. During the connection between the consumer's computer and the web server 87 of the store 85, the IP address of the consumer can be determined and stored in a database together with specific order details relating to the purchase of the dress 83. In case a combination of the consumer's IP address together with historic purchasing order details had already been stored in the database, and hence the IP address is recognized, the order details of the present order can be added to the existing record. Additionally details of previous orders may also be displayed on the web page opened by the consumer. Personal recommendations based on already placed orders may also be presented on the web page opened by the consumer. In case feedback is desired for the purchased dress 83, it may be requested on the web page as opened by the consumer. Hence, the basic functionality of the sample code 84 as a URL presents information relating to the purchased dress on a web page, and that basic functionality can be extended by adding one or multiple marketing related features to the web page. Thus, the consumer may be automatically recognized using their IP address, allowing for a more streamlined user experience, or a more conventional login process with a user ID and password may also be used.

Figure 14:
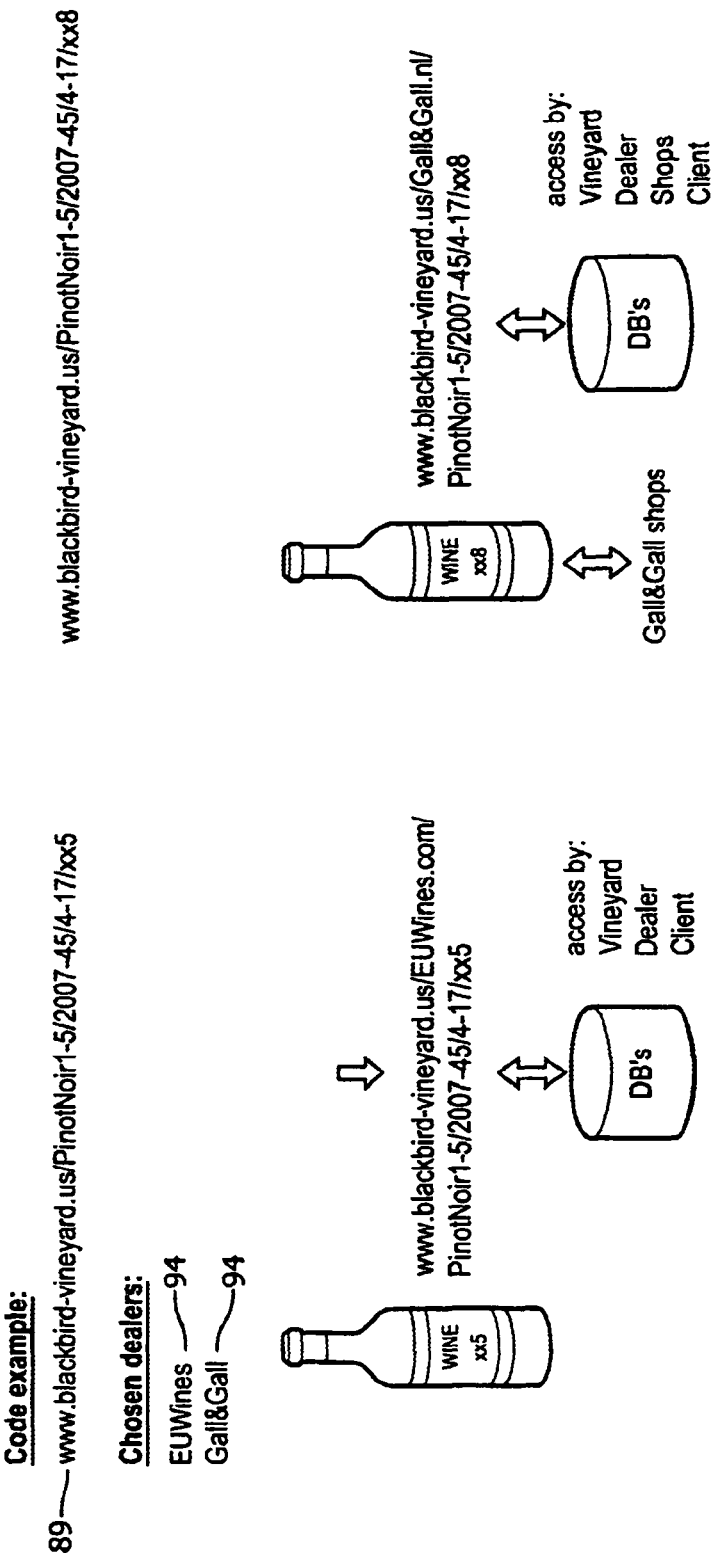
Figure 15:
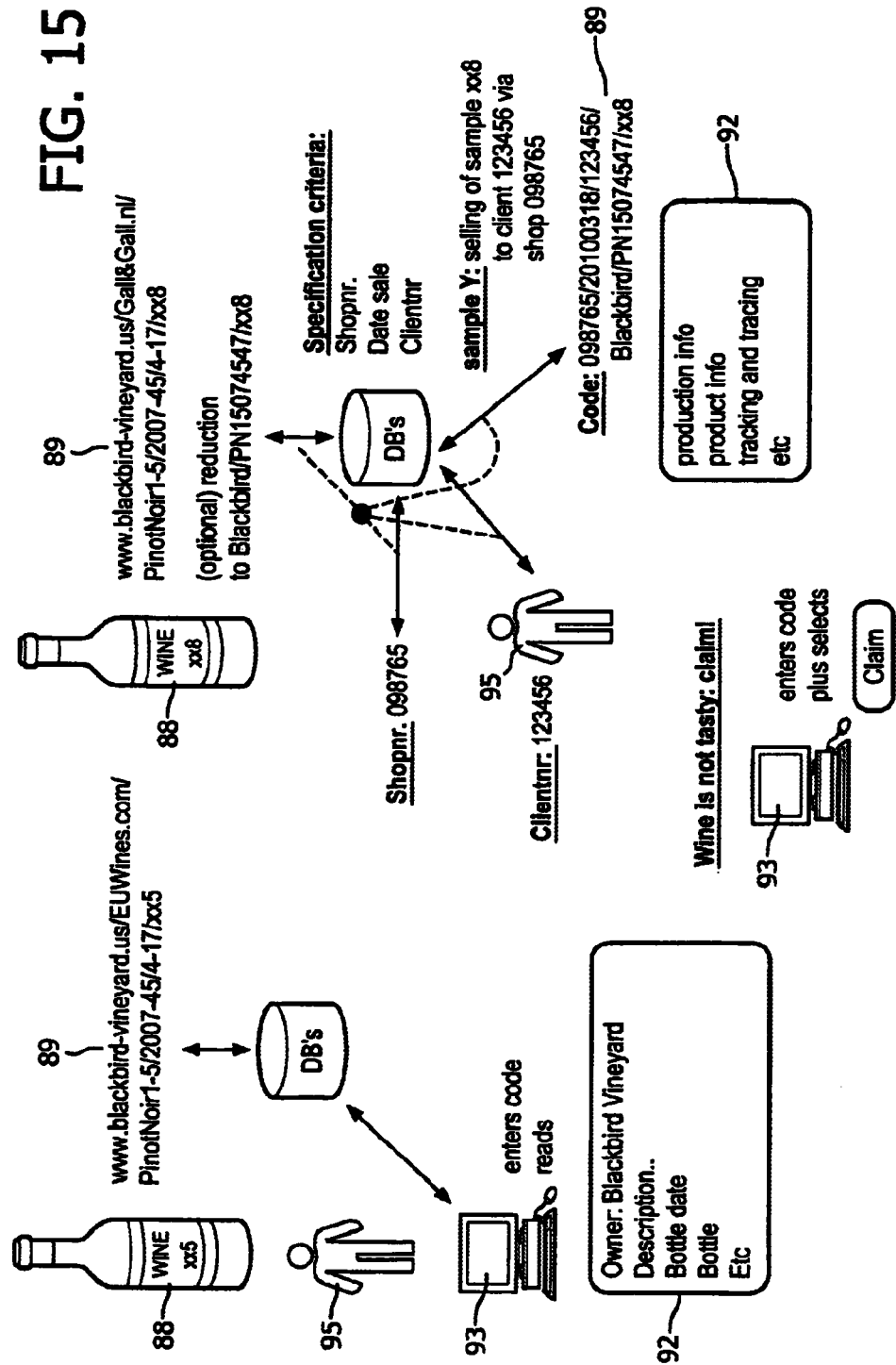

FIGS. 13-15 show an example of labeling wine bottles 88, wherein each wine bottle 88 is considered a unique sample according to an embodiment. Each wine bottle 88 is labeled with a world-wide unique sample code 89. The metadata used for building these sample codes 89 for each bottle 88 are (partially) based upon the origin of the specific bottle 88, wherein data relating to the vineyard 90 and the wine storage barrel 91 has been taken into account (FIG. 13). Moreover each wine bottle 88 is assigned an identification stamp, indicated as 'xx5' and 'xx8' in FIG. 14. By stringing the collected metadata the world-wide unique sample codes 89 can be compiled as shown in FIG. 14. The sample codes 89 also form a web link leading to a website 92 via which tailored sample information relating to the specific bottle of wine can be obtained using a computer 93 or mobile device connected to the Internet as shown in FIG. 15. A code segment relating to a wine dealer 94 distributing and/or selling the bottles 88 may also be incorporated in each sample code 89 as shown in FIG. 14. These optional intermediary related code segments may help determine the digital information related to the specific bottle 88 that can be accessed by different parties. A customer 95 may also receive a code, which may or may not be the same code 89 as the sample code provided to the wine dealer 94. It is conceivable that each customer 95 may receive a personal sample code 89 including a customer related code segment which may or may not determine the content of the bottle related information to be displayed to the customer. All data relating to the sample codes 89 and the physical sample related information associated with said sample codes 89 may be stored in one or more databases.

It should be noted that the above-mentioned embodiments illustrate rather than limit the invention, and that those skilled in the art will be able to design many alternative embodiments without departing from the scope of the appended claims. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A physical product sample, the physical product sample comprising:
   at least one unique physical product sample code, said physical product sample code comprising at least one sample code string of sample code segments, said sample code segments comprising at least a sample owner identifying code segment, and a sample identifying code segment,
   wherein:
      the sample owner identifying code segment specifies an Internet address of an owner of the physical sample; and
      said sample code string uniquely identifying each physical product sample as well as a reference to a unique digital location via which information related to the physical product sample can be accessed.

2. The physical product sample according to claim 1 wherein the physical product sample code is printed on the physical product sample.

3. The physical product sample according to claim 1, wherein the physical product sample code is represented in a machine-readable format on the physical product sample.

4. The physical product sample according to claim 3, wherein the physical product sample code is represented as a barcode and/or as a RFID tag.

5. The physical product sample according to claim 1, wherein the physical product sample code is represented as an alias on the physical product sample.

6. The physical product sample according to claim 1, wherein the owner identifying code segment comprises a domain name and/or an IP address associated with a web location where the information related to the physical product sample is stored.

7. The physical product sample according to claim 1, wherein the owner identifying code segment is linked to an identity of an owner or holder.

8. The physical product sample according to claim 1, wherein the sample code string comprises at least one checking code segment representing the result of a predetermined mathematical processing of at least one other sample code segment.

9. The physical product sample according to claim 1, wherein the sample code string comprises at least one user related code segment.

10. The physical product sample according to claim 9, wherein the user related code segment comprises a user identifying code segment.

11. The physical product sample according to claim 1, wherein the sample code string comprises at least one intermediary identifying code segment.

12. The physical product sample according to claim 1, wherein the sample code string comprises at least one production process related code segment relating to at least one parameter of the production process of the physical product sample.

13. A method for compiling a unique sample code for a physical sample, comprising:
   defining at least one sample code template comprising multiple sample code segments to be used for building a sample code for a physical sample, said sample code segments comprising:
      a sample owner identifying code segment; and
      a sample identifying code segment uniquely identifying each physical sample;
   specifying the content of the sample code segments to be used for building said sample code, wherein the sample owner identifying code segment specifies an Internet address, in particular an IP address and/or a domain name, of an owner of the physical sample;
   stringing the specified sample code segments to form the sample code; and
   defining a digital path to a digital location via which access can be gained to physical sample related information.

14. The method according to claim 13, further comprising storing the sample code, the digital path, and a cross-reference between the sample code and the digital path in a database.

15. The method according to claim 13, further comprising converting the sample code into a machine-readable format.

16. The method according to claim 13, wherein the method comprises translating at least the sample identifying code segment of the sample code into another language.

17. The method according to claim 13, further comprising creating a cross-reference between the sample code and the digital path defined in the event the sample code and the digital path are mutually distinctive.

18. A system for compiling a unique sample code comprising:
   at least one sample code template generator for defining at least one sample code template comprising multiple sample code segments to be used for building a sample code for a physical sample, said sample code segments at least comprising a sample owner identifying code segment, and a sample identifying code segment uniquely identifying each physical sample;
   at least one sample code segment specification module connected to said template generator for specifying the content of the sample code segments defined by means of the code template generator, wherein the sample owner identifying code segment is specified by an Internet address, in particular an IP address and/or a domain name, of an owner of the physical sample; and
   at least one code generator connected to said template generator and said specification module for stringing the specified sample code segments to form the sample code.

19. The system according to claim 18 further comprising:
   at least one database for storing at least one cross-reference between a generated sample code and a digital path to a digital location via which access can be gained to physical sample related information, in the event the sample code and the digital path are mutually distinctive.

20. The system according to claim 18, wherein the system further comprises a digital user interface for controlling the template generator, the specification module, and the code generator.

* * * * *